US 12,073,983 B2

(12) United States Patent
Fujii et al.

(10) Patent No.: US 12,073,983 B2
(45) Date of Patent: Aug. 27, 2024

(54) POWER CONVERSION DEVICE

(71) Applicant: Mitsubishi Electric Corporation, Tokyo (JP)

(72) Inventors: Kenta Fujii, Tokyo (JP); Takashi Kumagai, Tokyo (JP); Tomohito Fukuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 568 days.

(21) Appl. No.: 17/426,331

(22) PCT Filed: Mar. 6, 2020

(86) PCT No.: PCT/JP2020/009727
§ 371 (c)(1),
(2) Date: Jul. 28, 2021

(87) PCT Pub. No.: WO2020/203048
PCT Pub. Date: Oct. 8, 2020

(65) Prior Publication Data
US 2022/0102060 A1    Mar. 31, 2022

(30) Foreign Application Priority Data

Apr. 5, 2019    (JP) ................................. 2019-072930

(51) Int. Cl.
*H01F 27/28*    (2006.01)
*H01F 27/24*    (2006.01)
*H02M 3/335*    (2006.01)

(52) U.S. Cl.
CPC ......... *H01F 27/2876* (2013.01); *H01F 27/24* (2013.01); *H02M 3/335* (2013.01)

(58) Field of Classification Search
CPC ...... H01F 27/2876; H01F 27/24; H01F 27/22; H01F 27/266; H01F 27/306;
(Continued)

(56) References Cited

U.S. PATENT DOCUMENTS

2005/0270745 A1* 12/2005 Chen ................... H01F 27/2804
                                                             361/707
2010/0164670 A1*  7/2010 Nakahori ............. H01F 27/306
                                                             336/200
(Continued)

FOREIGN PATENT DOCUMENTS

JP    2013168401 A    8/2013
JP    2015173188 A    10/2015
(Continued)

OTHER PUBLICATIONS

International Search Report (PCT/ISA/210) with translation and Written Opinion (PCT/ISA/237) mailed on Jun. 2, 2020, by the Japan Patent Office as the International Searching Authority for International Application No. PCT/JP2020/009727. (8 pages).

*Primary Examiner* — Shawki S Ismail
*Assistant Examiner* — Kazi S Hossain
(74) *Attorney, Agent, or Firm* — BUCHANAN INGERSOLL & ROONEY PC

(57) ABSTRACT

In a coil device of a power conversion device, a laminated coil includes planar coils laminated on a surface of a support. A plurality of cores are spaced apart from each other and aligned in a longitudinal direction of the planar coils, and each core includes a portion around which the laminated coil is wound on the surface of the support. A first protruding member is arranged between a pair of cores adjacent to each other with respect to a longitudinal direction and is fixed to the support. A first fixing member is arranged above the first protruding member. The laminated coil is sandwiched and fixed between the first fixing member and the first protruding member such that a first surface is in contact with the first protruding member and a second surface is in contact with the first fixing member.

14 Claims, 19 Drawing Sheets

(58) Field of Classification Search
CPC ..... H01F 2027/2809; H01F 2027/2819; H01F 27/2804; H02M 3/335; H02M 1/0048; H02M 3/003; Y02B 70/10
USPC .............................................. 336/61, 55–60
See application file for complete search history.

(56) References Cited

U.S. PATENT DOCUMENTS

| | | | |
|---|---|---|---|
| 2012/0161911 A1* | 6/2012 | Moiseev | H01F 27/02 336/55 |
| 2016/0035481 A1* | 2/2016 | Hachiya | H01F 37/00 336/61 |
| 2016/0372250 A1 | 12/2016 | Chida et al. | |
| 2019/0019609 A1 | 1/2019 | Fujii et al. | |
| 2020/0267871 A1 | 8/2020 | Takahara et al. | |

FOREIGN PATENT DOCUMENTS

| | | |
|---|---|---|
| WO | 2017126315 A1 | 7/2017 |
| WO | 2018037690 A1 | 3/2018 |

* cited by examiner

POWER CONVERSION DEVICE

TECHNICAL FIELD

The present invention relates to a power conversion device including a coil deice as a transformer.

BACKGROUND ART

For example, a power conversion device such as a DC/DC converter is equipped with a coil device such as a smoothing choke and a transformer. The coil device is typically formed by winding a coil around a core. In recent years, order to downsize a transformer as a coil device, the switching frequency of switching elements mounted on the power conversion device is set to a high frequency, for example, 1 kHz or higher. This can reduce the cross-sectional area of the core and reduce the turns of the coil, thereby downsizing the transformer.

As the transformer is downsized, heat generated from the coil included in the transformer increases. The downsized coil with a smaller cross-section area has a larger electrical resistance. The downsized coil therefore has a larger temperature increase due to conduction loss when current is applied. Moreover, while the transformer can be downsized with a higher frequency of the switching elements, heat generated from the coil also increases in this case. When AC current flows through a conductor, skin effect occurs, in which current density is high at the surface of the conductor and decreases at a distance from the surface of the conductor. Therefore, as the frequency is higher, current intensively flows through the surface, so that AC resistance of the conductor increases and heat generated from the coil increases.

For example, in Japanese Patent Laying-Open No. 2015-173188 (PTL 1), a heat dissipation sheet is inserted between a coil wound in a planar shape and a core to reduce temperature increase of the coil.

CITATION LIST

Patent Literature

PTL 1: Japanese Patent Laying-Open No. 2015-173188

SUMMARY OF INVENTION

Technical Problem

In order to downsize the transformer with higher frequency, a planar coil is used, in which a plate-like coil is wound into a planar shape. A large-capacity transformer having a planar coil needs a large-size core. However, it is difficult to bake a large-size core, and the core performance is degraded. Then, in a large-capacity transformer, a plurality of small cores may be arranged, rather than providing one large-size core. As described above, in Japanese Patent Laying-Open No. 2015-173188 including a plurality of small cores arranged in a row, a coil is wound around a winding frame and attached to the cores. The coil is thus fixed to the cores. However, the coil is not yet fixed to the entire power conversion device including the coil device. In Japanese Patent Laying-Open No. 2015-173188, therefore, the cores and the coil may vibrate, and the cores and the coil may be destroyed.

The present invention is made in view of the problem above. An object of the present invention is to provide a power conversion device in which a planar coil included in a coil device is fixed to the entire device and vibration resistance improved.

Solution to Problem

A power conversion device according to the present disclosure includes a coil device. The coil device includes a support, a laminated coil, cores, a first protruding member, and a first fixing member. The laminated coil includes a plurality of planar coils laminated on a surface of the support. A plurality of cores are spaced apart from each other and aligned in a longitudinal direction of the planar coils, and each core includes a portion around which the laminated coil is wound on the surface of the support. The first protruding member is arranged between a pair of cores adjacent to each other with respect to the longitudinal direction and is fixed to the support. The first fixing member is arranged above the first protruding member. The laminated coil is sandwiched and fixed between the first fixing member and the first protruding member such that a first surface is in contact with the first protruding member and a second surface is in contact with the first fixing member.

Advantageous Effects of Invention

The present invention provides a power conversion device in which a planar coil included in a coil device is fixed to the entire device and vibration resistance is improved.

DESCRIPTION OF EMBODIMENTS

Embodiments will be described below with reference to the drawings. The X direction, the Y direction, and the Z direction are introduced for convenience of explanation.

First Embodiment

Introduction

Figure 7:
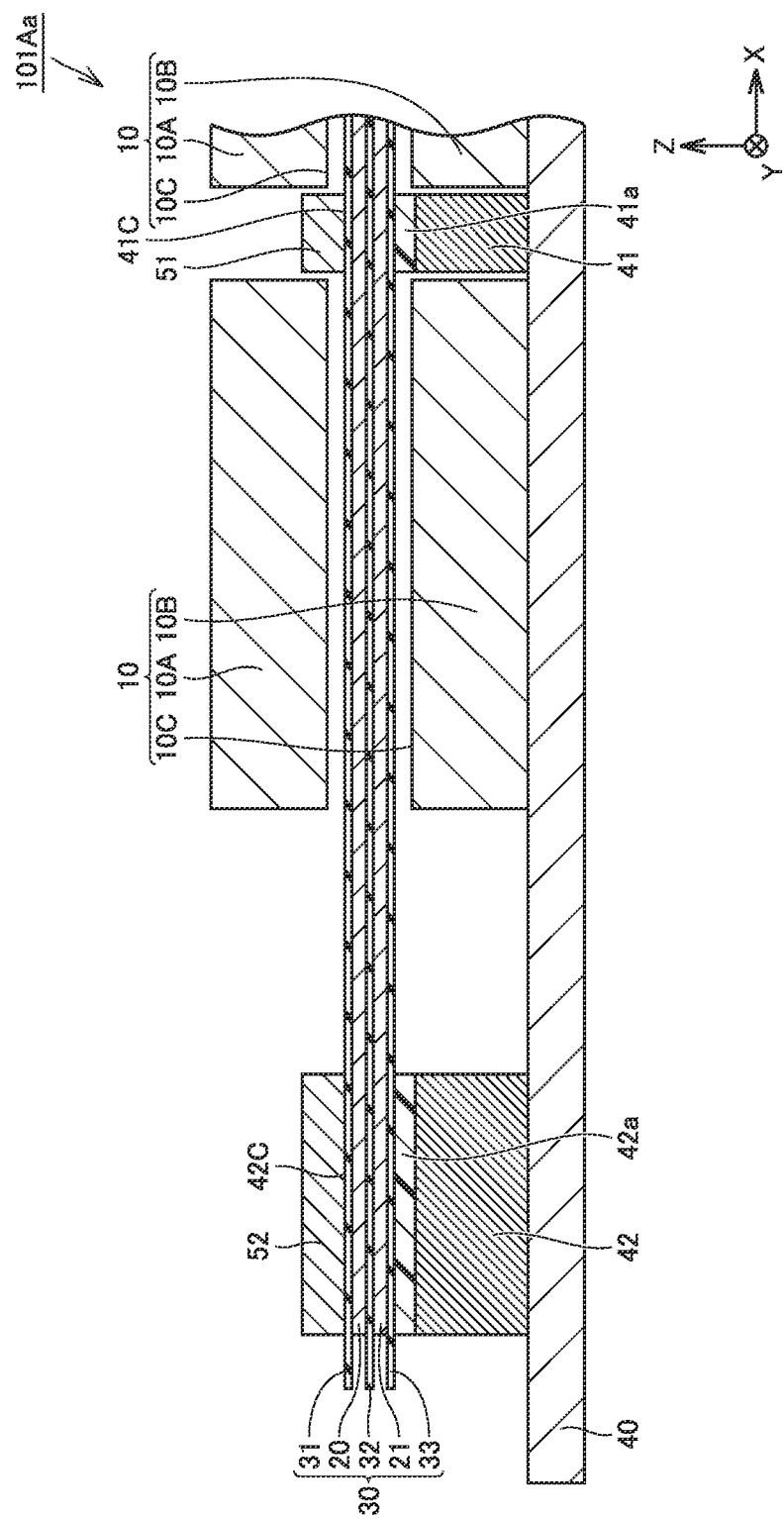
FIG. 7 is a schematic cross-sectional view of the coil device in FIG. 2 in a portion along line VII-VII in FIG. 4.

First of all, the configuration characteristics of a coil device in a first example of the present embodiment will be described briefly. Referring to FIG. 7, a coil device 101Aa included in a power conversion device of the present embodiment includes a support 40, a laminated coil 30, and cores 10. In laminated coil 30, a first coil 20 and a second coil 21 are laminated. A plurality of cores 10 are spaced apart and aligned in the X direction. A first protruding member 41 is arranged between cores 10. First protruding member 41 fixed to support 40. A first fixing member 51 is provided above (for example, immediately above) first protruding member 41. Laminated coil 30 is sandwiched and fixed between first fixing member 51 and first protruding member 41 such that its lower-side surface in the Z direction (including a first heat transfer member 41a) is in contact with first protruding member 41 and its upper-side surface in the Z direction is in contact with first fixing member 51. The power conversion device will be described below, focusing on the configuration of the coil device included therein.

In the present description, for example "first fixing member 51 is provided immediately above first protruding member 41" means that at least a part of first fixing member 51 is arranged in an upper-side region overlapping with first protruding member 41 in a two-dimensional view. That is, it means that, us viewed from the upper side in the Z direction in FIG. 7, first protruding member 41 overlaps with at least a part of first fixing member 51.

Configuration of Power Conversion Device

Figure 1:
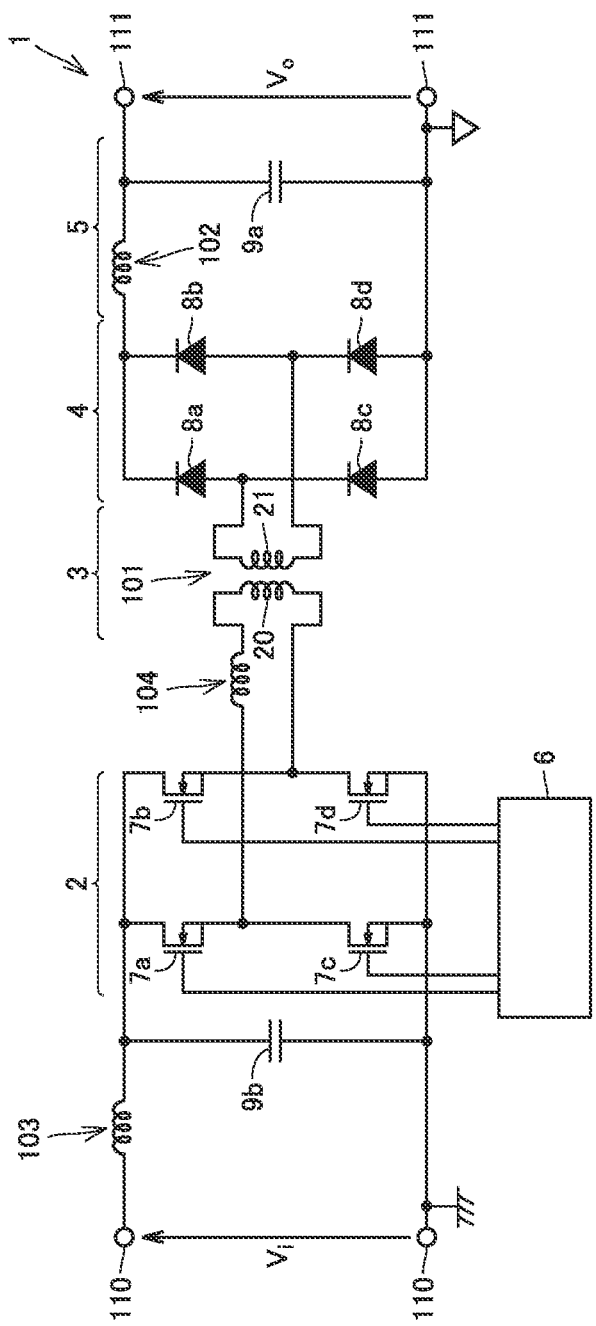
FIG. 1 is a circuit diagram showing a configuration of a power conversion device according to embodiments.

FIG. 1 is a circuit diagram showing a configuration of a power conversion device according embodiments. Referring to FIG. 1, a power conversion device 1 is a DC/DC converter but may be a device that converts AC voltage. Power conversion device mainly includes an inverter circuit 2, a transformer circuit 3, a rectifying circuit 4, a smoothing circuit 5, and a control circuit 6. Power conversion device 1 converts DC voltage Vi input from an input terminal 110 into DC voltage Vo and outputs DC voltage Vo from on output terminal 111.

Inverter circuit 2 includes four switching elements 7a, 7b, 7c, and 7d. For example, in FIG. 1, a series connection of switching element 7a and switching element 7c and a series connection of switching element 7b and switching element 7d are connected in parallel. Each of switching elements 7a, 7b, 7c, and 7d is, for example, a metal oxide semiconductor field effect transistor (MOSFET) or an insulated gate bipolar transistor (IGBT). For each of switching elements 7a, 7b, 7c, and 7d, one selected from the group consisting of silicon (Si), silicon carbide (SiC), and gallium nitride (GaN) is used as its material.

Transformer circuit 3 as a coil device 101 as a transformer. Coil device 101 includes first coil 20 and second coil 21. First coil 20 is a primary-side conductor, that is, a high voltage-side winding, connected to inverter circuit 2. Second coil 21 is a secondary-side conductor, that is, a low voltage-side winding, connected to rectifying circuit 4.

Rectifying circuit 4 includes four diodes 8a, 8b, 8c, and 8d. For example, FIG. 1, a series connection of diode 8a and diode 8c and a Series connection of diode 8b and diode 8d are connected in parallel. For each of diodes 8a, 8b, 8c, and 8d, one selected from the group consisting of silicon (Si), silicon carbide (SiC), and gallium nitride (GaN) is used as its material.

Smoothing circuit 5 includes a coil device 102 as a smoothing choke and a capacitor 9a. Control circuit 6 plays a role of outputting a control signal for controlling inverter circuit 2 to inverter circuit 2, Inverter circuit 2 converts input voltage and outputs the converted voltage.

Power conversion device 1 includes a coil device 103 as a smoothing choke and a capacitor 9b at a stage preceding inverter circuit 2. Power conversion device 1 includes a coil device 104 as a resonant coil between no circuit 2 and transformer circuit 3. More specifically, coil device 104 is connected between a point between switching element 7a and switching element 7c, first coil 20.

For example, DC voltage Vi of 100 V or higher and 600 V or lower is input to power conversion device 1. Power conversion device 1 outputs, for example, DC voltage Vo of 12 V or higher and 600 V or lower. Specifically, DC voltage Vi input to input terminal 110 of power conversion device 1 is converted to a first AC voltage by inverter circuit 2. The first AC voltage is converted to a second AC voltage lower than the first AC voltage by transformer circuit 3. The second AC voltage is rectified by rectifying circuit 4. Smoothing circuit 5 smooths the voltage output from rectifying circuit 4. Power conversion device 1 outputs DC voltage Vo output from smoothing circuit 5 from output terminal 111. DC voltage Vi may be of a magnitude equal to or higher than DC voltage Vo.

Referring now to FIG. 2 to FIG. 7, the configuration of coil device 101 included in the power conversion device in the first example of the present embodiment will be described.

Configuration of Coil Device 101

Figure 2:
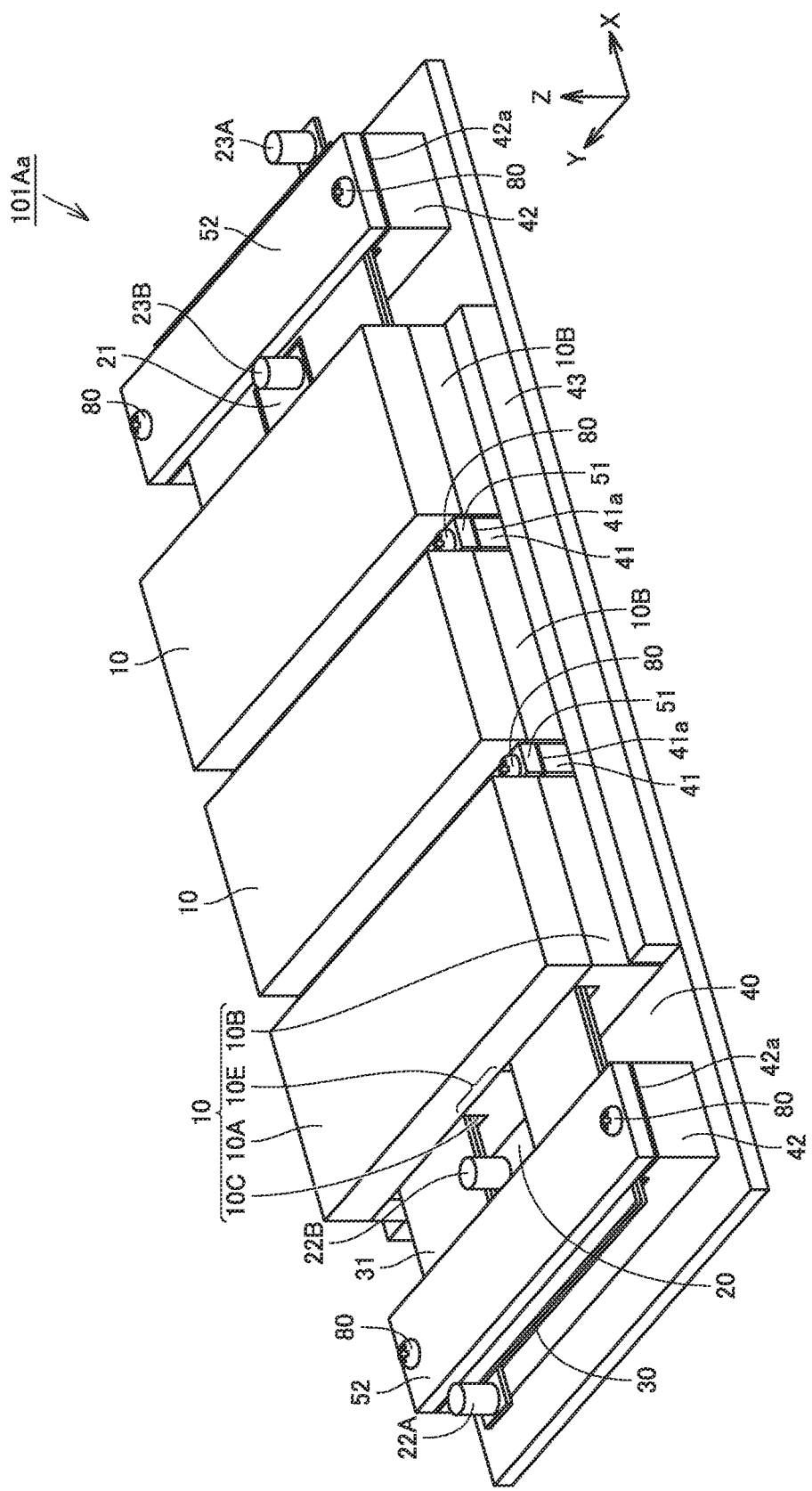
FIG. 2 is a schematic perspective view showing a configuration of a coil device as a transformer according to a first example of the first embodiment.
Figure 3:
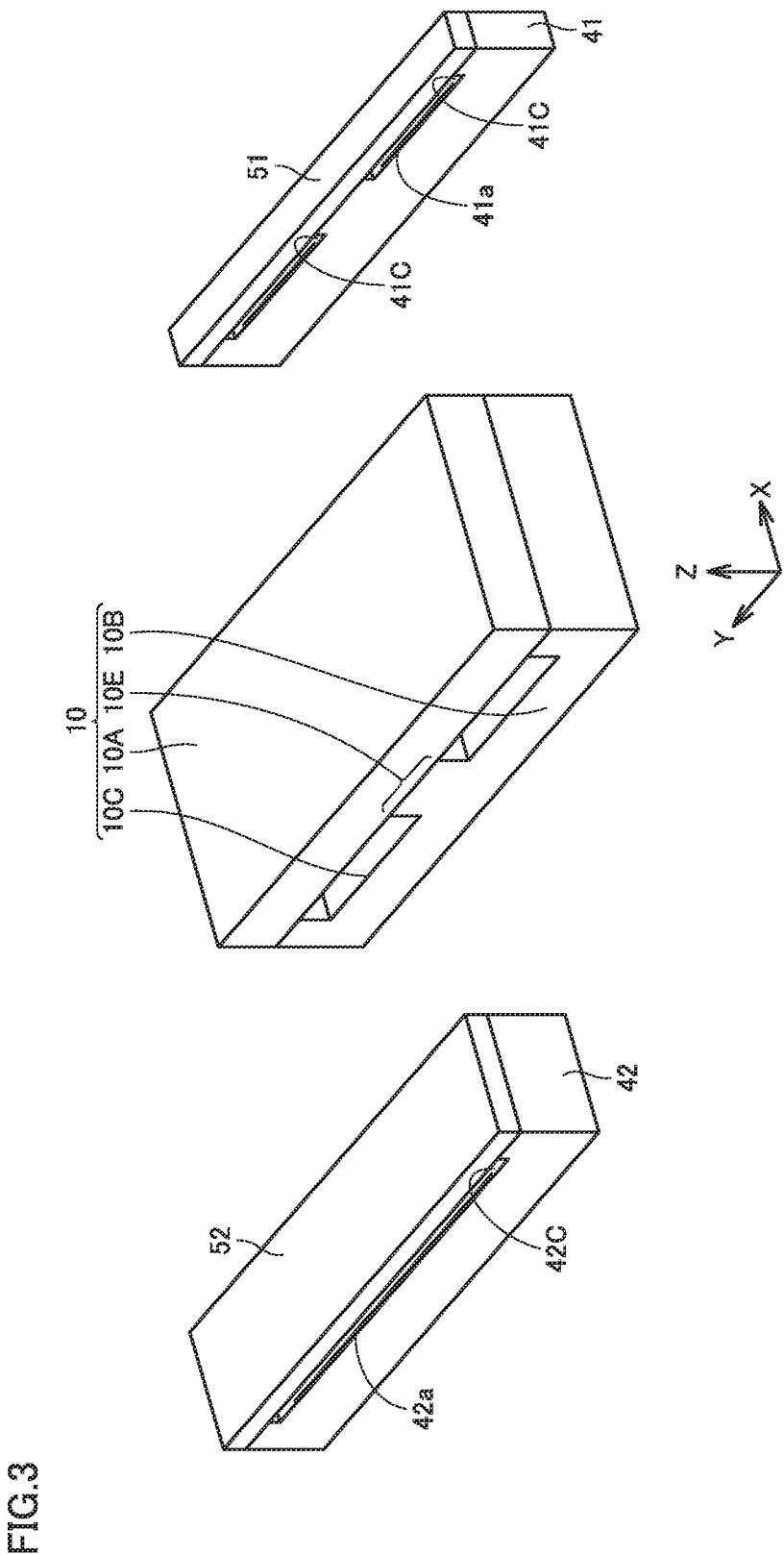
FIG. 3 is a schematic perspective view showing a core, first and second fixing members, and first and second protruding members extracted from the coil device in FIG. 2.
Figure 4:
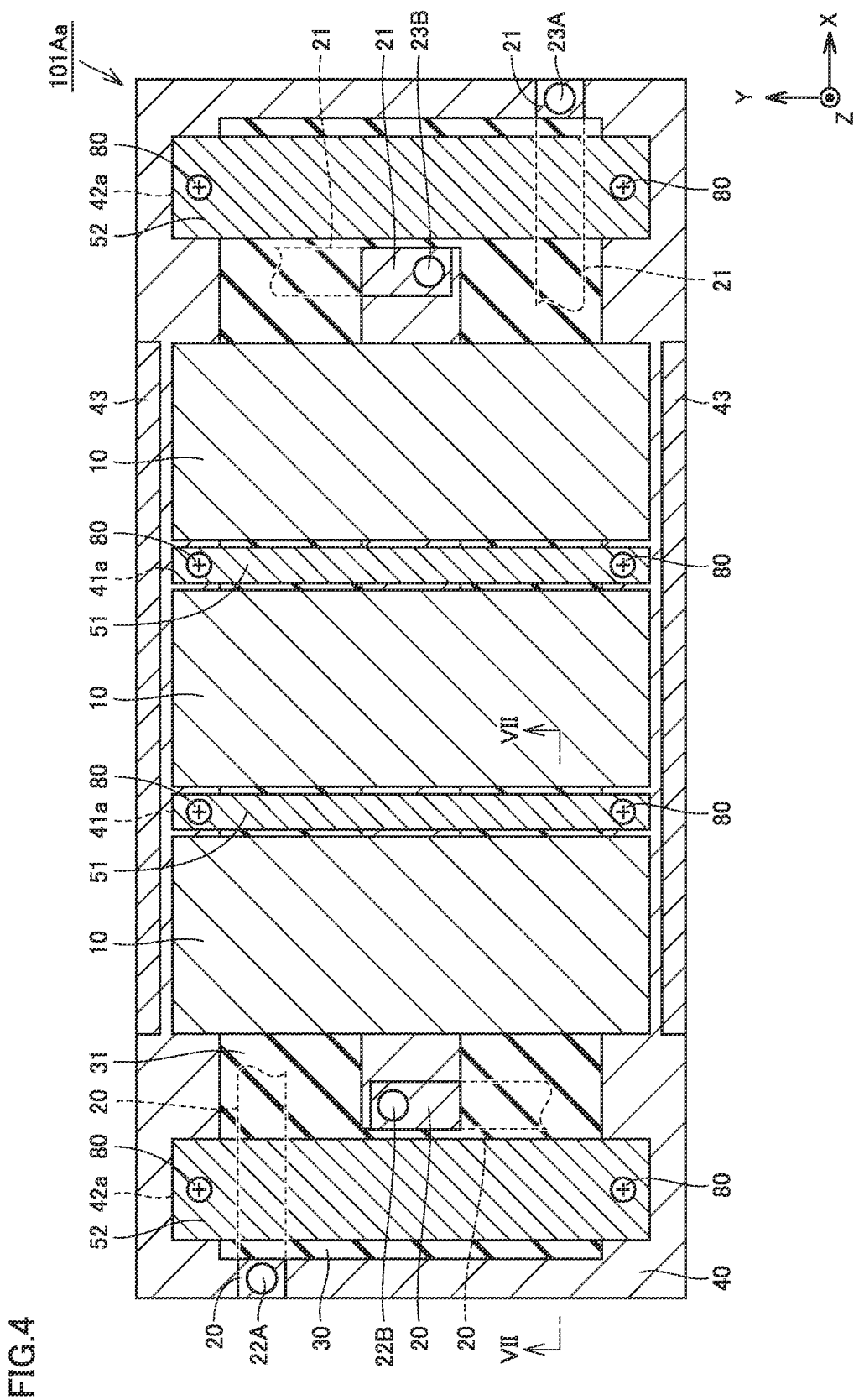
FIG. 4 is a schematic plan view of the coil device in FIG. 2.
Figure 5:
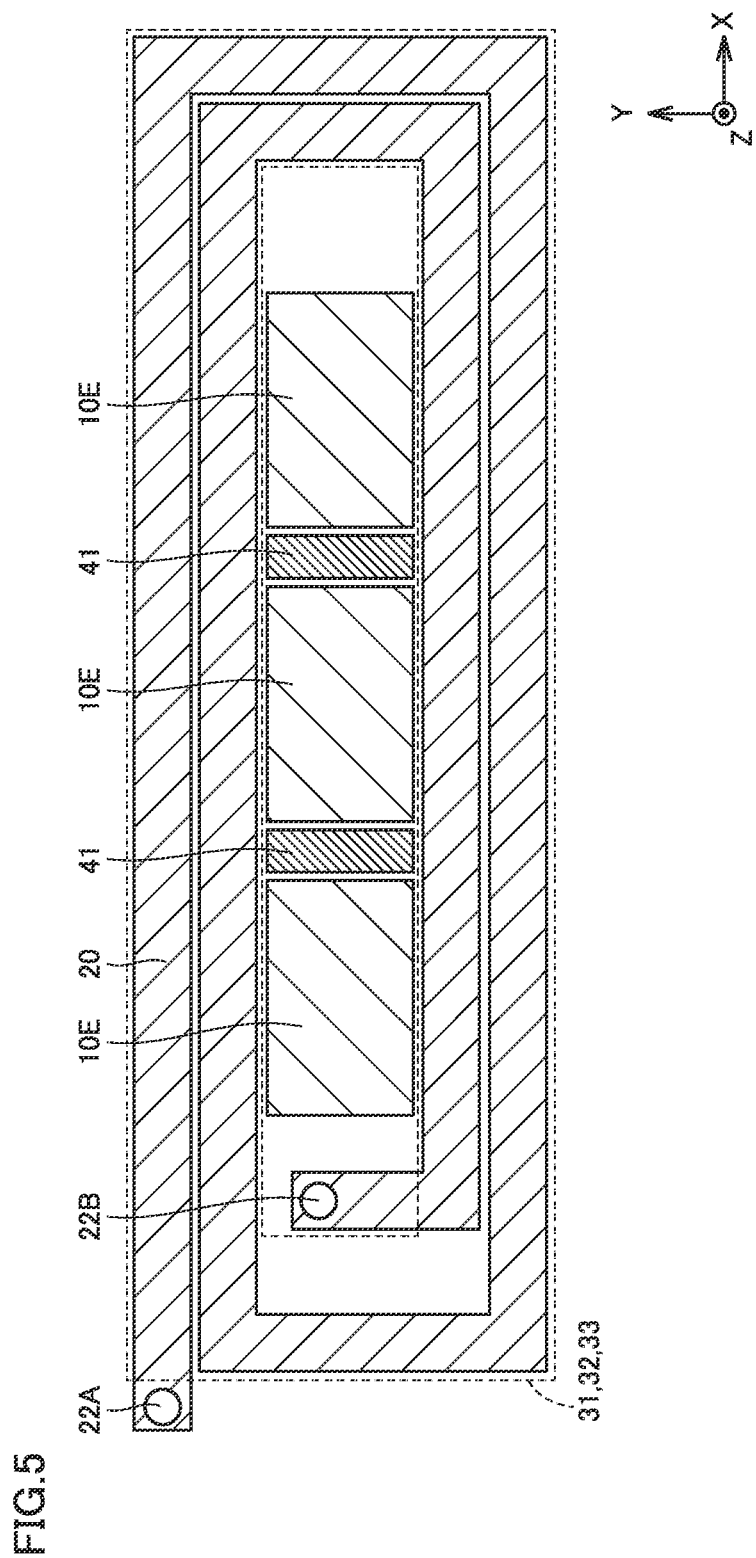
FIG. 5 is a schematic plan view of a portion of a first coil extracted from the coil device in FIG. 2.
Figure 6:
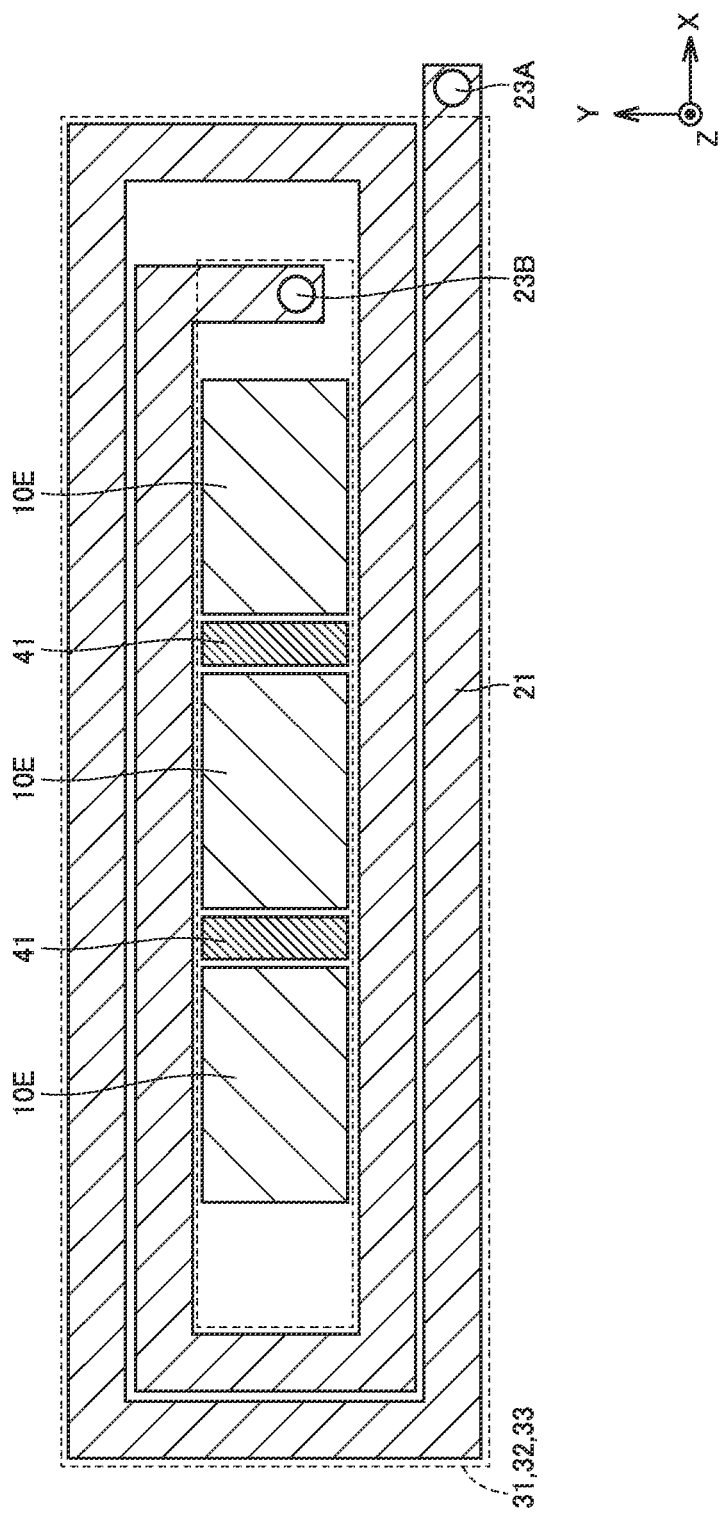
FIG. 6 is a schematic plan view of a portion of a second coil extracted from the coil device in FIG. 2.

FIG. 2 is a schematic perspective view showing a configuration of the coil device as a transformer according to the first example of the first embodiment. FIG. 3 is a schematic perspective view showing the cores, the first and second fixing members, and the first and second protruding members extracted from the coil device in FIG. 2. FIG. 4 is a schematic plan view of the coil device in FIG. 2. FIG. 5 is a schematic plan view of a portion of the first coil extracted from the coil device in FIG. 2. FIG. 6 is a schematic plan view of a portion of the second coil extracted from the coil device in FIG. 2. FIG. 7 is a schematic cross-sectional view of the device in FIG. 2 in a portion along line VII-VII in FIG. 4.

Referring to FIG. 2 to FIG. 7, coil device 101Aa in the first example of the present embodiment is an example of coil device 101 as a transformer included in power conversion device 1 shown in FIG. 1. Coil device 101Aa includes support 40. Support 40 is a part of a housing for the entire power conversion device 1 including coil device 101Aa. Actually, for example, members other than support 40 in FIG. 2 are arranged so as to be accommodated in the interior of a box-shaped housing. However, the entire housing is not illustrated to make the drawing more visible. Here, only a portion of support 40 in the shape of a flat plate that is the lowermost portion in the Z direction of the housing is illustrated and used in the following description.

Support 40 may be a cooler of the housing including the same. The entire housing including support 40 is shaped like, for example, a rectangular parallelepiped box. Support 40 is made of metal and plays a role of accommodating each member and also plays a role of a cooler. That is, the following members are attached to support 40 in a region excluding the region in which coil device 101Aa, for example, shown in FIG. 2 is arranged. Input terminal 110, output terminal 111, switching elements 7a to 7d, diodes 8a to 8d, and capacitors 9a and 9b are attached to support 40. The ground of power conversion device 1 is connected to support 40.

Coil device 101Aa mainly includes laminated coil 30, cores 10, first protruding members 41, second protruding members 42, first fixing members 51, second fixing members 52, first heat transfer members 41a, and second heat transfer members 42a. These are mounted on, for example, a surface of support 40.

As shown in FIG. 7, laminated coil 30 includes first coil 20 and second coil 21 as planar coils. Laminated coil 30 also includes insulating members 31, 32, and 33. In laminated coil 30, insulating member 31, first coil 20, insulating member 32, second coil 21, and insulating member 33 are laminated in this order from the upper layer to the lower layer. As shown in FIG. 5, first coil 20 and second coil 21 each are a planar coil, for example, in the shape of a substantially rectangular flat plate with its main surface extending along the XY plane. These first coil 20 and second coil 21 correspond to first coil 20 and second coil 21 of coil device 101 in FIG. 1. In laminated coil 30, insulating member 32 is sandwiched between first coil 20 and second coil 21. Thus, first coil 20 that is a high voltage-side winding and second coil 21 that is a low voltage-side winding are electrically insulated in coil device 101Aa. In laminated coil 30, insulating member 31 is arranged above first coil 20, and insulating member 33 is arranged below second coil 21. Thus, the insulating members are arranged on the outermost surfaces of the entire laminated coil 30.

As indicated by the dotted line in FIG. 5, insulating member 31, insulating member 32, and insulating member 33 are arranged in a region two-dimensionally overlapping with first coil 20 and second coil 21, substantially from the outermost edges to the innermost edges of first coil 20 and second coil 21. Insulating members 31 to 33 therefore are shaped like a rectangular and annular flat plate having a substantially rectangular cavity approximately at the center in a two-dimensional view.

More specifically, first coil 20 and second coil 21 in laminated coil 30 are formed as bus bars. The thickness in the Z direction of the bus bar as first coil 20 and second coil 21 is, for example, 0.1 mm or more and 5.0 mm or less. As shown in FIG. 5, a connection member 22A is provided at the outside end that is one end in the turning direction of first coil 20. A connection member 22B is provided at the inside end that is the other end in the turning direction of first coil 20. First coil 20 is wound clockwise from connection member 22A to connection member 22B. As shown in FIG. 6, a connection member 23A is provided at the outside end that is one end in the turning direction of second coil 21. A connection member 23B is provided at the inside end that is the other end in the turning direction of second coil 21. Second coil 21 is wound clockwise from connection member 23A to connection member 23B. Connection members 22A, 22B, 23A, and 23B are, for example, terminal blocks and are electrically connected to electronic components that constitute inverter circuit 2 and rectifying circuit 4. Connection members 22A, 22B, 23A, and 23B are arranged so as not to be covered with other members and to be exposed.

First coil 20 and second coil 21 may be wound with one or more turns or may be wound with less than one turn. As an example, in FIG. 5, first coil 20 and second coil 21 are wound with two turns. In first coil 20 and second coil 21, the cross-sectional area of a partial region in its turning direction may be different from that of the other region in the turning direction. As used herein the cross-sectional area is a cross section intersecting the turning direction. Therefore, the cross-sectional area changing with regions means that, for example, the width intersecting the turning direction in a two-dimensional view changes from region to region in first coil 20 and second coil 21 if the thickness of first coil 20 and second coil 21 is uniform in its entirety.

Core 10 includes an upper core 10A and a lower core 10B and these are combined so as to be meshed to form a single core 10. Upper core 10A and lower core 10B contain a magnetic substance. As shown in FIG. 2, three cores 10 each having a combination of upper core 10A and lower core 10B are spaced apart from each other and aligned in the X direction that is the longitudinal direction of first coil 20 and second coil 21.

As shown in FIG. 2 and FIG. 3, upper core 10A has a shape of the letter I (I shape), and lower core 10B has, for example, a shape of the letter E (E shape). Lower core 10B therefore has two cavities 10C spaced apart from each other in the Y direction between upper core 10A and lower core 10B when its uppermost surface meshes with tipper core 10A. The body of core 10 is not arranged in cavities 10C. Two cavities 10C extend so as to pass through each core 10 in entirety with respect to the X direction. As shown in FIG. 2, FIG. 3, FIG. 5, and FIG. 6, a wound portion 10E is arranged between two cavities 10C aligned in the Y direction. As shown in FIG. 5, wound portion 10E is a portion formed in the body of lower core 10B and around which first coil 20 and second coil 21 turning on the XV plane are wound. In other words, wound portion 10E is a part of lower core 10B. Since first coil 20 and second coil 21 pass through two cavities 10C in the X direction, first coil 20 and second coil 21 are wound around wound portion 10E sandwiched between two cavities 10C. Since laminated coil 30 as a whole passes through two cavities 10C, not only first coil 20 and second coil 21 but also insulating members 31 to 33 pass through two cavities 10C.

Core 10 in FIG. 2 and FIG. 3 has the EI shape including the I-shaped upper core 10A the E-shaped lower core 10B. However, core 10 is not limited to this shape and may be, for example, in EE shape or CC shape. However, for example, core 10 cannot have the II shape in which both of upper core 10A and lower core 10B are in I shape. This is because, in this case, cavity 10C is not formed when upper core 10A and lower core 10B are meshed, and the coil device 101 that is a transformer (see FIG. 1) does not function. That is, when upper core 10A and lower core 10B are meshed, cavity 10C need to be formed therebetween. First coil 20 and second coil 21 turning in the X direction pass through cavity 10C to achieve the function as coil device 101 that is a transformer.

Upper core 10A is pushed toward support 40 on the lower side in the Z direction, for example, by a not-shown spring or a plate. Lower core 10B is pushed toward support 40 on the lower side in the Z direction by the weight of upper core 10A. In the present embodiment, core 10 is thus mounted so as to be fixed on a surface of support 40.

However, laminated coil 30 is not necessarily in contact with upper core 10A or lower core 10B. In production laminated coil 30 is installed not in contact with the surfaces of upper core 10A and lower core 10B but has a distance from the surfaces thereof. This is shown in FIG. 7 in which there is a gap between laminated coil 30 and upper core 10A and between laminated coil 30 and lower core 10B. However, laminated coil 30 may be in contact with upper core 10A or lower core 10B. When being in contact in this manner, laminated coil 30 is fixed to core 10, thereby suppressing vibration of laminated coil 30 and core 10 and suppressing damage to laminated coil 30 and core 10. Furthermore, when being in contact in this way, core 10 and laminated coil 30 achieve a homogeneous temperature. However, in this case, first coil 20 and second coil 21 included in laminated coil 30 need to be electrically insulated from core 10 reliably.

First protruding member 41 is arranged between a pair of cores 10 adjacent to each other with respect to the X direction among three cores 10. First protruding member 41 has a narrow width with respect to the X direction and extends with a dimension equivalent to core 10 with respect to the Y direction. First protruding member 41 therefore has a relatively elongated shape in a two-dimensional view. First protruding member 41 is fixed to support 40. That is, first protruding member 41 is fixed, for example, in contact with the upper-side surface of support 40. First protruding member 41 may be formed integrally with support 40. However, first protruding member 41 may be formed as a separate body from support 40 and they may be fixed to each other, for example, by bonding. As used herein fixing is not limited to fixing by bonding in a strict sense but includes, for example, fixing to such a degree as not to easily slide or move by pressing from above in a contact state. First protruding member 41 may be integrated with a portion of the housing other than support 40 or may be a separate bud fixed to a portion of the housing by bonding or the like.

In coil device 101Aa, three cores 10 are spaced apart from each other and aligned in the X direction. Hence, two regions are formed each between a pair of cores 10 adjacent to each other. One first protruding member 41 is arranged in each of these two regions. Coil device 101Aa therefore includes a plurality of (two) first protruding members 41.

Above first protruding member 41 in the Z direction, first fixing member 51 is arranged with spacing from first protruding member 41 in the Z direction. That is, for example, immediately above first protruding member 41 in the Z direction, first fixing member 51 is arranged with a spacing from first protruding member 41 in the Z direction. Furthermore, on the upper-side surface in the Z direction of first protruding member 41, first heat transfer member 41a is placed adjacent to laminated coil 30 and in contact with laminated coil 30. It is assumed that first heat transfer member 41a is included in first protruding member 41. First heat transfer member 41a may have substantially the same planar shape as first protruding member 41 as long as it is at least arranged to be sandwiched in a region between the lowermost surface of laminated coil 30 and the uppermost surface of the first protruding member 41. The region between the lowermost surface of laminated coil 30 and the uppermost surface of first protruding member 41 corresponds to interior region of cavity 41C described later as shown in FIG. 3.

First fixing member 51 is arranged to fix laminated coil 30 to its lower side, that is, toward first protruding member 41. It is therefore preferable that first fixing member 51 has substantially the same planar shape as first protruding member 41. Specifically, first fixing member 51 is a flat plate having a relatively elongated planar shape having a narrow width with respect to the X direction and extending with a dimension equivalent to core 10 with respect to the Y direction. As shown in FIG. 2 and FIG. 4, first fixing member 51 is fixed to first protruding member 41 or support 40 on its lower side for example, by screws 80. This is for first fixing member 51 to press laminated coil 30 toward support 40 on the lower side in the Z direction by tightening force of screws 80. However, first fixing member 51 is fixed to first protruding member 41 or support 40 on its lower side with laminated 30 and first heat transfer member 41a interposed. As shown in FIG. 7, therefore, in laminated coil 30, the lower surface of insulating member 33 that is the lowermost surface of the whole is in contact with first protruding member 41 with first heat transfer member 41a interposed. On the other hand, laminated coil 30, the upper surface of insulating member 31 that is the uppermost surface at the is in contact with first fixing member 51. In this way, laminated coil 30 is sandwiched and fixed between first fixing member 51 and first protruding member 41.

Laminated coil 30 therefore is sandwiched in contact with first fixing member 51 and first heat transfer member 41a. That is, the lower surface of insulating member 33 of laminated coil 30 is in surface contact with first heat transfer member 41a, and the upper surface of insulating member 31 of laminated coil 30 is in surface contact with first fixing member 51. Furthermore, first heat transfer member 41a is in surface contact with first protruding member 41. Hence, laminated coil 30 is firmly pressed and fixed by first fixing member 51 and first protruding member 41 including first heat transfer member 41a from above and below. On the other hand, as shown in FIG. 7 above, upper core 10A and lower core 10B are not necessarily in contact with laminated coil 30, and a gap may be formed. In this way, first fixing member 51 and first heat transfer member 41a differ in configuration hum upper core 10A and lower core 10B in that they need to be in contact with laminated coil 30.

As shown in FIG. 3, first fixing member 51 has the I shape, and first protruding member 41 has, for example, the E shape. That is, when first fixing member and first protruding member 41 are meshed, for example, two cavities 41C are formed therebetween with a spacing in the Y direction. These two cavities 41C are arranged substantially at the same Y coordinates as two cavities 10C of core 10 and are formed to extend in the entire first protruding member 41 with respect to the X direction Thus, first coil 20 and second coil 21 turned to pass through two cavities 10C of core 10 are turned to pass through two cavities 41C.

As described later, first heat transfer member 41a is formed of a material having flexibility or a material having fluidity. Hence, the pressing force downward by tightening of screws 80 compresses first heat transfer member 41*a*. As long as first heat transfer member 41*a* has substantially the same Shape as first protruding member 41, first heat transfer member 41*a* may be deformed so as to be continuous from the bottom surface to the side surface of the inner wall of cavity 41C and in contact with an inner wall surface of cavity 41C so as to follow the shape of the inner wall surface, but first heat transfer member 41*a* need not be in contact with the side surface of the inner wall of cavity 41C. As shown in FIG. 3, when first heat transfer member 41*a* is originally arranged only in a region between the lowermost surface of laminated coil 30 and the uppermost surface of first protruding member 41, first heat transfer member 41*a* is arranged only on the bottom surface of inner wall of cavity 41C.

Although not shown in the drawings, the first heat transfer member may be sandwiched also between first fixing member 51 and the upper surface of insulating member 31 of laminated coil 30. This first heat transfer member is arranged in a region adjacent to and contact with laminated coil 30 and considered to be included in first fixing member 51. Conversely, the first heat transfer member is not sandwiched between first protruding member 41 and laminated coil 30 but may be sandwiched only between first fixing member 51 and laminated coil 30. Also in this case, the first heat transfer member is considered to be included in a part of first fixing member 51.

As shown in FIG. 2, FIG. 4, and FIG. 7, in total, two second protruding members 42 are arranged on the outside of three cores 10 with respect to the X direction, that is, on the positive side and the negative side, in the X direction of three cores 10. Second protruding member 4 is spaced apart from three cores 10 in the X direction. Second protruding member 42 may be wider than first protruding member 41 with respect to the X direction and extends with a dimension equivalent to core 10 with respect to the Y direction. However, second protruding member 42 has relatively elongated shape in a two-dimensional view. Second protruding member 42 is fixed to support 40. More specifically, second protruding member 42 is fixed to, for example, the upper-side surface of support 40. Second protruding member 42 may be formed integrally with support 40. However, second protruding member 42 may be formed as a separate body from support 40, and they may be fixed to each other, for example, by bonding. Second protruding member 42 may be integrated with a portion of the housing other than support 40 or may be fixed to a portion of the housing by bonding or the like.

Above second protruding members 42 in the direction, in total, two second fixing members 52 are arranged, one for each second protruding member 42 with a spacing in the Z direction. That is, for example, immediately above second protruding members 42 in the Z direction, in total, two second fixing members 52 are arranged, one for each second protruding member 42 with a spacing in the Z direction. Furthermore, on the upper-side surface in the Z direction of second protruding member 42, second, heat transfer member 42*a* is placed adjacent to laminated coil 30 and in contact with laminated coil 30. Second heat transfer member 42*a* is considered to be included in second protruding member 42. Second heat transfer member 42*a* may have substantially the same planar shape as second protruding member 42 as long as it is at least arranged so as to be sandwiched in a region between the lowermost surface of laminated coil 30 and the uppermost surface of second protruding member 42. The region between the lowermost surface of laminated coil 30 and the uppermost surface of second protruding member 42 corresponds to an interior region of cavity 42C described later as shown in FIG. 3.

Second fixing member 52 is arranged to fix laminated coil 30 to its lower side, that is, toward second protruding member 42. It is therefore preferable that second fixing member 52 is a flat plate having substantially the same planar shape as second protruding member 42. Specifically, second fixing member 52 has a relatively elongated planar shape having a narrow width with respect to the X direction and extending with a dimension equivalent to core 10 with respect to the Y direction.

As shown in FIG. 2 and FIG. 4, second fixing member 52 is fixed to second protruding member 42 or support 40 on its lower side, for example, by screws 80. This is for second fixing member 52 to press laminated coil 30 toward support 40 on the lower side in the Z direction by tightening force of screws 80. However, second fixing member 52 is fixed to second protruding member 42 or support 40 on its lower side with laminated coil 30 and second heat transfer member 42*a* interposed. As shown in FIG. 7, therefore, in laminated coil 30, the lower surface of insulating member 33 that is the lowermost surface of the whole is in contact with second protruding member 42 with second heat transfer member 42*a* interposed. On the other hand, in laminated coil 30, the upper surface of insulating member 31 that is the uppermost surface of the whole is in contact with second fixing member 52, in this way, laminated coil 30 is sandwiched and fixed between second fixing member 52 and second protruding member 42.

Laminated coil 30 therefore is sandwiched in contact with second fixing member 52 and second heat transfer member 42*a*. That is, the lower surface of insulating member 33 of laminated coil 30 is in surface contact with second heat transfer member 42*a*, and the upper surface of insulating member 31 of laminated 30 is in surface contact with second fixing member 52. Furthermore, second heat transfer member 42*a* is in surface contact with second protruding member 42. Hence, laminated coil 30 is firmly pressed and fixed by second fixing member 52 and second protruding member 42 including second heat transfer member 42*a* from above and below. On the other hand, as shown in FIG. 7 above, upper core 10A and lower core 10B are not necessarily in contact with laminated coil 30, and a gap may be formed. In this way, second fixing member 52 and second heat transfer member 42*a* differ in configuration from upper core 10A and lower core 10B in that they need to be in contact with laminated coil 30.

As shown in FIG. 3, second fixing member 52 has the I shape, and second protruding member 42 has, for example, the C shape. That is, when second fixing member 52 and second protruding member 42 are meshed, for example, one cavity 42C is formed therebetween. Cavity 42C is arranged substantially at the same Y coordinates as two cavities 10C of core 10 and wound portion 10E therebetween and is formed to extend in the entire second protruding member 42 with respect to the X direction. Thus, first coil 20 and second coil 21 turned to pass through two cavities 10C of core 10 are turned to pass through cavity 42C. However, second protruding member 42 also may have the E shape in which two cavities having the same shape can be formed at the same position as first protruding member 41 with respect to the Y direction.

As described later, second heat transfer member 42*a* is formed of a material having flexibility or a material having fluidity. Hence, the pressing force downward by tightening of screws 80 compresses second heat transfer member 42*a*.

As long as second heat transfer member 42a has substantially the same shape as second protruding member 42, second heat transfer member 42a may be deformed so as to be continuous from the bottom surface to the side surface of the inner wall of cavity 42C and in contact with the inner wall surface of cavity 42C so as to follow the shape of the inner wall surface, but second heat transfer member 42a need not be in contact with the side surface of the inner wall of cavity 42C. As shown in FIG. 3, when second heat transfer member 42a is originally arranged only in a region between the lowermost surface of laminated coil 30 and the uppermost surface of second protruding member 42, second heat transfer member 42a is arranged only on the bottom surface of the inner wall of cavity 42C.

Although not shown in the drawings, the heat transfer member may be sandwiched also between second fixing member and the upper surface of insulating member 31 of laminated coil 30. This second heat transfer member is arranged in a region adjacent to and in contact with laminated coil 30 and considered to be included in second fixing member 52. Conversely, the second heat transfer member is not sandwiched between second protruding member 42 and laminated coil 30 but may be sandwiched only between second fixing member 52 and laminated coil 30. Also in this case, the second heat transfer member is considered to be included in a part of second fixing member 52.

In addition, support protruding portions 43 may be formed on a part of a surface of support 40. As shown in FIG. 2 and FIG. 4, support protruding portions 43 are arranged, for example, one on each of the positive side and the negative side in the Y direction, and spaced apart from three cores 10 with respect to the Y direction. The pair of support protruding portions 43 extend in the X direction. More specifically the pair of support protruding portions 43 are arranged so as to sandwich core 10 with respect to the Y direction. Support protruding portions 43 are fixed to support 40, similarly to first protruding members 41, but may be integrated with or separate from support 40. The pair of support protruding portions 43 are thus provided to prevent lower core 10B from moving on a surface of support 40 and moving out of it. Therefore, as, long as such an effect is achieved, any other methods may be employed. For example, a depressed portion may be formed at a part of the upper-side main surface of support 40, and lower core 10B may be accommodated so as to be fitted in the depressed portion.

Material and Properties

It is preferable that support 40 has a thermal conductivity of 0.1 W/(m·K) or more. However, it is more preferable that support 40 has a thermal conductivity of 1.0 W/(m·K) or more. Among these, it is farther preferable that support 40 has a thermal conductivity of 10.0 W/(m·K) or more.

It is preferable that support 40 is formed of a material having rigidity. Specifically, support 40 is formed of a metal material selected from the group consisting of copper (Cu), aluminum (Al), iron (Fe), iron alloys such as SUS304, copper alloys such as phosphor bronze, and aluminum alloys such as ADC12. Alternatively, support 40 may be formed of a resin material containing a thermal conductive filler. Here, the resin material is, for example, one selected from the group consisting of polybutylene terephthahlate (PBT), polyphenylene sulfide (PPS), and polyether ether ketone (PEEK). Except for iron, the material used for support 40 is preferably a nonmagnetic substance. When first protruding members 41 and second protruding members 42 are integrated with support 40, they are made of the same material as support 40 as described above. When first protruding members 41 and second protruding members 42 are separate from support 40, they may be made of the same material as support 40 or may be made of a material different from support 40. Support 40 is formed, for example, through a process selected from the group consisting a machining, die casting, forging, and molding using a mold.

The body of upper core 10A and lower core 10B (including wound portion 10E) is formed of, for example, a manganese zinc (Mn—Zn)-based ferrite core or a nickel zinc (Ni—Zn)-based ferrite core. However, upper core 10A and lower core 10B may be for example, amorphous cores or iron dust cores. Amorphous cores are formed of iron-based amorphous alloy. Iron dust cores are formed by pressure-forming iron powder.

First coil 20 and second coil 21 included in laminated coil 30 are formed of a conductive material. Specifically, first coil 20 and second coil 21 are formed of one selected from the group consisting of copper (Ag), gold (Au), tin (Sn), copper alloy, nickel (Ni) alloy, gold alloy, silver alloy, and tin alloy. First coil 20 and second coil 21 may be formed of different materials.

Connection members 22A and 22B may be formed of the same material as first coil 20 or may be formed of a different material. Connection members 23A and 23B may be formed of the same material as second coil 21 or may be formed of a different material. Connection members 22A, 22B, 23A, and 23B are formed of a conductive material. Specifically, connection members 22A, 22B, 23A, and 23B are formed of one selected from the group consisting of copper, silver, gold, tin, iron, copper alloy, nickel alloy, gold silver alloy, on alloy, and iron alloy.

Insulating members 31 to 33 included in laminated coil 30 have a flat plate shape or a thin foil or film shape. Insulating members 31 to 33 are formed of any material having electrical insulating properties. Specifically, insulating members 31 to 33 are formed of, for example, polyethylene terephthalate (PET) or polyimide (PI) films or paper formed of aramid (wholly aromatic polyamide) fibers. Alternatively, insulating members 31 to 33 may be formed of one selected from the group consisting of glass fiber reinforced epoxy resin, phenolic resin, polyphenylene sulfide (PPS), and polyether ether ketone. Alternatively, insulating members 31 to 33 may be formed of a ceramic material such as aluminum oxide ($Al_2O_3$) or aluminum nitride (AlN). As other characteristics, insulating members 31 to 33 may have a sticky layer or an adhesive layer on any surface, and insulating members 31 to 33 may be sticked or bonded to first coil 20 and second coil 21 through this sticky layer or adhesive layer.

First fixing member 51 and second fixing member 52 are formed of a material having high rigidity. Specifically, first fixing member 51 and second fixing member 52 may be formed of any metal material selected from the group consisting of copper, aluminum, iron, iron alloys such as SUS304, copper alloys such as phosphor bronze, and aluminum alloys such as ADC12. Alternatively, first fixing member 51 and second fixing member 52 may be formed of a resin material containing a thermal conductive filler. Here, the resin material is, for example, one selected from the group consisting of polybutylene terephthalate, polyphenylene sulfide, and polyether ether ketone. Except for iron, the material used for first fixing member 51 and second fixing member 52 is preferably a nonmagnetic substance. First fixing member 51 and second fixing member 52 are formed, for example, through a process selected from the group consisting of machining, die casting, forging, and molding using a mold.

First heat transfer member 41a and second heat transfer member 42a have a thermal conductivity greater than insulating members 31 to 33. Under such a condition, first heat transfer member 41a and second heat transfer member 42a have a thermal conductivity of 0.1 W/(m·K) or more, specifically 1.0 W/(m·K) or more, more specifically 10.0 W/m·K) or more.

First heat transfer member 41a and second heat transfer member 42a may have high rigidity or may have high flexibility. First heat transfer member 41a and second heat transfer member 42a may have high elasticity. First heat transfer member 41a and second heat transfer member 42a may have electrical insulating properties. First heat transfer member 41a and second heat transfer member 42a may contain a thermal conductive filler. In a case where first heat transfer member 41a and second heat transfer member 42a have flexibility or fluidity, first heat transfer member 41a and second heat transfer member 42a are compressed when laminated coil 30 is pressed toward support 40. Thus, first heat transfer member 41a and second heat transfer member 42a may be deformed and come into direct contact with first coil 20 and second coil 21. Furthermore, first heat transfer member 41a and second heat transfer member 42a may be in contact with upper core 10A and lower core 10B.

The material that forms first heat transfer member 41a and second heat transfer member 42a is as follows. It is preferable that first heat transfer member 41a and second heat transfer member 42a are formed of one of a material such as silicone or urethane and a resin material such as epoxy or urethane. Alternatively, first heat transfer member 41a and second heat transfer member 42a may be a resin material selected from the group consisting of acrylonitrile butadiene styrene (ABS), polybutylene terephthalate, polyphenylene sulfide, and phenol. Furthermore, first heat transfer member 41a and second heat transfer member 42a may be formed of one of a polymer material such as polyimide and a ceramic material such as aluminum oxide or aluminum nitride. Furthermore, first heal transfer member 41a and second heat transfer member 42a may be formed of a silicone rubber sheet or a polyurethane rubber sheet. Furthermore, first heat transfer member 41a and second heat transfer member 42a may be formed of silicone gel, silicone grease, or silicone adhesive.

Screws 80 are, for example, pan head screws or countersunk head screws and may be formed in any shape. Screws 80 may be for example, rivets. Coil device 101Aa need not have screws 80 when first fixing members 51 and second fixing members 52 are fixed to support 40 or first protruding members 41 and second protruding members 42 by a method such as adhesive, caulking, or welding.

Operation Effect

The background of the present embodiment will now be described, and then the operation effect of coil device 101Aa in the first example of the present embodiment will be described.

Since a planar coil that is used for downsizing a transformer with higher frequency has a large area in a two-dimensional view, it is important to fix a surface portion having a large area of the planar coil. Once the surface portion having a large area is fixed, the entire planar coil is sufficiently fixed. Accordingly, vibration of the planar coil and the core that the planar coil is wound around is suppressed.

When a planar coil is used for a large-capacity transformer, a plurality of compact cores are arranged in order to avoid difficulty in baking. The sum of the plane areas of the arranged compact cores therefore increases, resulting in a larger plane area of the planar coil. Here, for example, consider a case where laminated coil 30 in coil device 101Aa described above is sandwiched and fixed in contact only with second fixing members 52 and second protruding members 42 (second heat transfer members 42a) at both ends in the X direction. That is, in this case, laminated coil 30 is not sandwiched or fixed in contact with first fixing member 51 and first protruding member 41 (first heat transfer member 41a) between a pair of cores 10. In this case, the distance in the X direction between the positions at which laminated coil 30 is sandwiched and fixed in contact with another member is increased. Thus, in this case, the portion of laminated coil 30 passing through cores 10 is not in contact with cores 10 and is floated with a gap from cores 10. In other words, laminated coil 30 is not fixed to cores 10. The natural frequency of laminated coil 30 is therefore reduced. Consequently, laminated coil 30 may be deformed or destroyed by vibration or may give shock to cores 10 to destroy the cores. That is, vibration may break laminated coil 30 itself or destroy cores 10, or may break electrical or mechanical connection to another member such as first coil 20 of laminated coil 30.

On the other hand, even if the planar coil is fixed at least to the cores, breakage of the cores and the coil due to vibration is inevitable unless they are fixed to another member of the power conversion device.

Coil device 101Aa of power conversion device 1 in the present embodiment has the following configuration. Coil device 101Aa includes support 40, laminated coil 30, cores 10, first protruding members 41, and first fixing members 51. In laminated coil 30, a plurality of planar coils are laminated as first coil 20 and second coil 21 on a surface of support 40. Core 10 includes a portion around which laminated coil 30 is wound on a surface of support 40, and a plurality of cores 10 are spaced apart from each other and aligned in the X direction that is the longitudinal direction of first coil 20 and second coil 21. First protruding member 41 is arranged between a pair of cores 10 adjacent to each other with respect to the X direction that is the longitudinal direction and is fixed to support 40. First fixing member 51 is arranged above first protruding member 41. Laminated coil 30 is sandwiched and fixed between first fixing member 51 and first protruding member 41 such that its first surface (lower surface) is in contact with first protruding member 41 and its second surface (upper surface) on the opposite side to the first surface is in contact with first fixing member 51.

Thus, laminated coil 30 is sandwiched between first protruding member 41 and first fixing member 51 arranged between a pair of cores 10, and there is almost no gap therebetween. That is, laminated coil 30 has a region sandwiched in contact with another member and firmly fixed at a region near the center in the longitudinal direction. The distance between the positions at which laminated coil 30 is sandwiched and firmly fixed in contact with another member with respect to the X direction is reduced. The natural frequency of laminated coil 30 is therefore increased. Since the natural frequency of laminated coil 30 is increased, the amount of laminated coil 30 deformed when vibration and shock is applied to power conversion device 1 is reduced.

Consequently, breakage of upper core 10Aa, lower core 10B, insulating members 31 to 33, first coil 20, and second coil 21 can be suppressed.

First protruding member 41 is fixed to support 40. Laminated coil 30 sandwiched by first protruding member 41 thus fixed to the housing including support 40, that is, the entire power conversion device 1. If the core and the coil are fixed but a fixed set of the core and the coil is not fixed to the housing, vibration to the housing would occur causing breakage. Such inconvenience can be prevented.

As described above, the present embodiment enhances the enhances of improving vibration resistance of the members including cores 10 and first coil 20 and second coil 21 and preventing breakage due to vibration.

The first surface that is the lowermost surface of laminated coil 30 is in contact with first protruding member 41. This configuration can enhance the effect of heat dissipation from laminated coil 30 to first protruding member 41 on its lower side. The second surface that is the uppermost surface of laminated coil 30 is in contact with first fixing member 51. This configuration can enhance the effect of heat dissipation from laminated coil 30 to first fixing member 51 on us upper side. Accordingly, using first protruding member 41 and first fixing member 51, heat generated from first coil 20 and second coil 21 is efficiently dissipated from both directions, from above and below, and temperature increase of first coil 20 and second coil 21 can be suppressed. In coil device 101Aa described above, three or more cores 10 are aligned in the longitudinal direction. It is preferable that a plurality of first protruding members 41 are included, each arranged between a pair of cores 10 adjacent to each other in the longitudinal direction. That is, a plurality of first protruding members 41 are spaced apart in the longitudinal direction. With this configuration, the distance between the positions sandwiched and fixed between adjacent first protruding members 41 and first fixing members 51 can be reduced with respect to the longitudinal direction. As a result, the natural frequency of laminated coil 30 is increased, so that breakage of upper core 10A, lower core 10B, insulating members 31 to 33, first coil 20 and second coil 21 is prevented more reliably.

It is preferable that coil device 101Aa described above further includes second protruding members 42 and second fixing members 52. Second protruding members 42 are arranged on the outside of a plurality of cores 10 with respect to the X direction that is the longitudinal direction. Second fixing member 52 is arranged above second protruding member 42. Laminated coil 30 is sandwiched and fixed between second fixing member 52 and second protruding member 42 such that its first surface (lower surface) is in contact with second protruding member 42 and its second surface (upper surface) is in contact with second fixing member 52.

With this configuration, laminated coil 30 can be fixed so as to be sandwiched not only at the position near the center in the longitudinal direction of core 10 but also at the regions on the outside of a plurality of cores 10, that is, both ends in the longitudinal direction, similarly to the center. With this configuration, the distance between the adjacent positions at which laminated coil 30 is sandwiched and fixed can be reduced with respect to the longitudinal direction. As a result, the natural frequency of laminated coil 30 is increased so that breakage of upper core 10A, lower core 10B, insulating members 31 to 33, first coil 20 and second coil 21 is prevented more reliably.

The lowermost surface of laminated coil 30 is in contact with second protruding member 42, and the uppermost surface is in contact with second fixing member 52. Accordingly, using second protruding member 42 and second fixing member 52, heat generated from first coil 20 and second coil 21 is efficiently dissipated from both directions, from above and below, and temperature increase of first coil 20 and second coil 21 can be suppressed.

In coil device 101Aa described above, it is preferable that second protruding member 42 are fixed to support 40. With this configuration, an effect similar to the effect achieved by fixing first protruding members 41 to support 40 can be achieved. More specifically, laminated coil 30 sandwiched by second protruding member 42 is fixed to the housing including support 40, that is the entire power conversion device 1. If the core and the coil are fixed but a fixed set of the core and the coil is not fixed to the housing, vibration to the housing would occur causing breakage. Such inconvenience can be prevented.

In coil device 101Aa described above, at least one of first protruding member 41 and first fixing member 51 further includes first heat transfer member 41a arranged adjacent to and in contact with laminated coil 30. At least one of second protruding member 42 and second fixing member 52 further includes second heat transfer member 42a arranged adjacent to and in contact with laminated coil 30. Such a configuration is preferable.

When current flows through first coil 20 and second coil 21 and coil device 101Aa operates, heat s generated due to energy loss in upper core 10A and lower core 10B. The generated heat in upper core 10A is transferred lower core 10B, and the generated heat in lower core 10B is transferred to support 40. The heat transferred to support 40 is dissipated to its underside. First heat transfer 41a and second heat transfer member 42a interposed can enhance this heat dissipation effect.

Furthermore, current flows through first coil 20 and second coil 21 to produce Joule heat therein. The generated heat in first coil 20 is transferred to support 40 through insulating member 32, second coil 21, insulating member 33, first heat transfer member 41a, and first protruding member 41, and dissipated therefrom. The generated heat in second coil 21 is transferred to support 40 through second heat transfer member 42a, similarly. Such a heat transfer effect is enhanced by first heat transfer member 41a and second heat transfer member 42a interposed. When a plurality of first protruding members 41 are arranged, the number of places capable of heat dissipation is increased accordingly, and the heat dissipation effect is further enhanced. Thus, temperature increase of first coil 20 and second coil 21 can be suppressed. For example, when both of first protruding member 41 and first fixing member 51 include first heat transfer member 41a, the heat dissipation effect is even further enhanced, compared with when only one of them includes first heat transfer member 41a. This is applicable to second heat transfer member 42a.

Modifications

Figure 8:
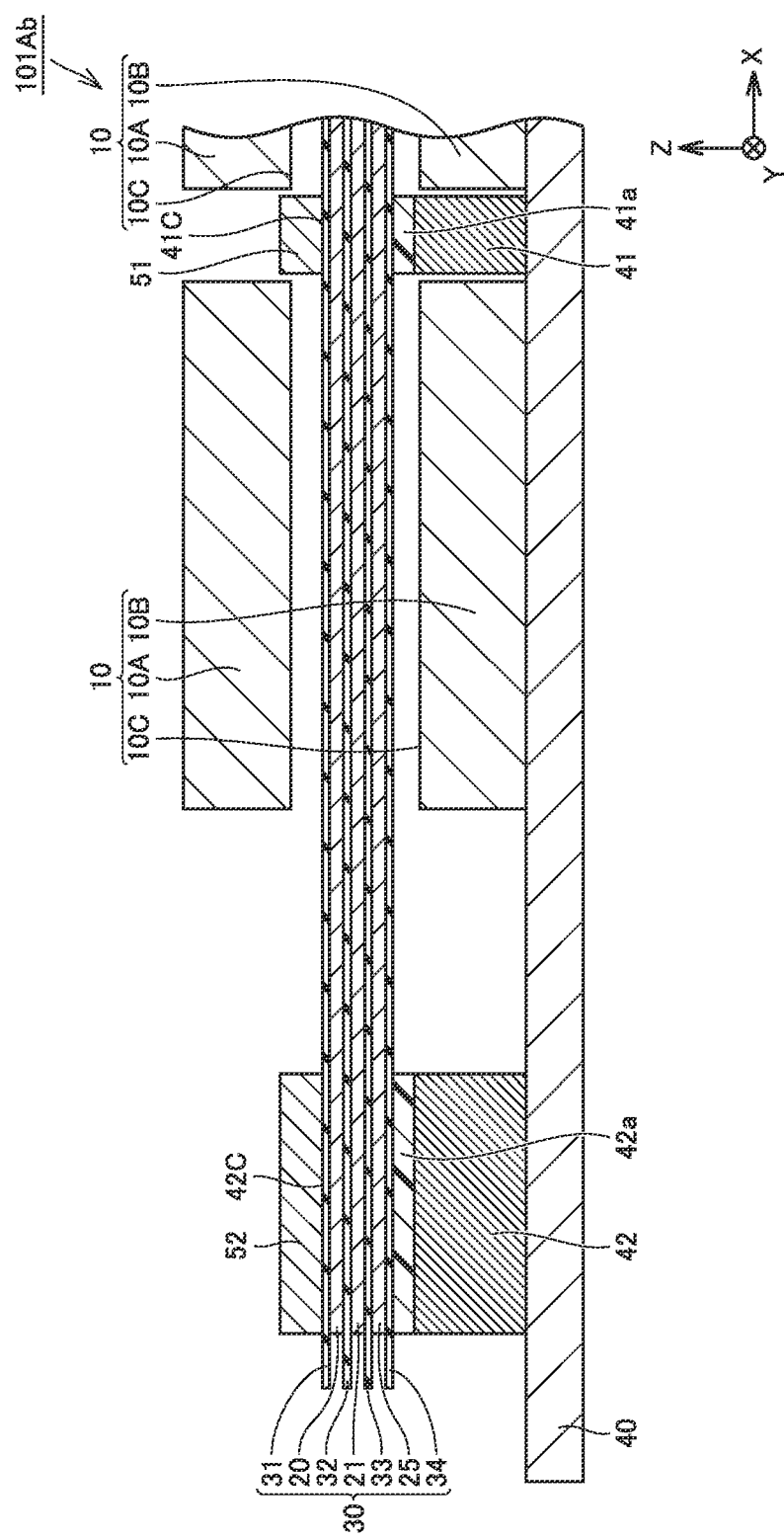
FIG. 8 is a schematic cross-sectional view showing a configuration of the coil device as a transformer according to a second example of the first embodiment.

FIG. 8 is a schematic cross-sectional view showing a configuration of the coil device as a transformer according to a second example of the first embodiment. That is, this corresponds to FIG. 7 for the coil device in the second example of the first embodiment. Referring to FIG. 8, a coil device 101Ab in the second example or the present embodiment basically has a configuration similar to coil device 101Aa, and the same components are denoted by the same reference signs and will not be further elaborated. However, in coil device 101Ab, three layers of coils are laminated in laminated coil 30. Specifically, in FIG. 8, first coil 20, second coil 21, and a second coil 25 are laminated as planar coils in laminated coil 30. In laminated coil 30, insulating member 31, first coil 20, insulating member 32, second coil 21, insulating member 33, second coil 25, and an insulating member 34 are laminated in this order from the upper layer to the lower layer. Second coil 25 is a low voltage-side winding in coil device 101Ab, similar to second coil 21. That is, second coil 21 and second coil 25 are electrically connected in parallel by insulating members 33 and 34. As described above, coil device 101Ab includes two second coils 21 and 25.

Operation Effect

In this way, coil device 101Ab may include a plurality of either or both of first coils and second coils. The operation effect achieved by this configuration is as follows. For example, as shown in FIG. 8, because of two second coils 21 and 25 connected in parallel as secondary-side, that is, low voltage-side windings, a value of current flowing through each of second coils 21 and 25 can be reduced, and heat generation in the second coils can be suppressed. Furthermore, since second coil 25 having a high thermal conductivity is added to laminated coil 30 in addition to second coil 21, the temperature in laminated coil 30 can be homogenized. Furthermore, since second coil 25 having high rigidity is added in laminated coil 30, the rigidity of the entire laminated coil 30 increases and vibration resistance of laminated coil 30 is further improved.

Other Modifications

The foregoing first example and second example of the first embodiment may be modified as follows as appropriate, in addition to the modification above. The modifications are listed below.

Coil device 101Ab described above has one first coil 20 and two second coils 21 and 25. However, the coil device has at least one first coil and at least one second coil. The number of first coils and the number of second coils included in the coil device can be combined as desired. For example, the coil device may have two first coils and one second coil.

In general, coils with a large heat production due to current application are arranged in layers and connected in parallel so that temperature increase of laminated coil 30 can be reduced. Alternatively, for example, second coils 21 and 25 that are multilayered coils may be connected in series rather than being connected in parallel. The turns can be changed by connecting coils in series. The first coil(s) and the second coil(s) may be laminated in any order in laminated coil 30. For example, the second coil, the first coil, and the second coil may be laminated in this order from the upper layer to the lower layer. Furthermore, a pair of coils adjacent to each other with respect to the Z direction that is the lamination direction may have the same potential or may have different potentials. More specifically, for example, in FIG. 2, first coil 20 and second coil 21 may have different potentials, and first coil 20, second coil 21, and a plurality of cores 10 may constitute coil device 101Aa as one transformer. As described above, the number of layers of first coils and second coils, series or parallel connection, and the like may be combined as desired in laminated coil 30 in coil device 101Ab.

Furthermore, although coil devices 101Aa and 101Ab each include three cores 10, they may include four or more or any number of cores. For example, coil devices 101Aa and 101Ab each may include four, five, or six cores 10.

A configuration of coil device 101 as a transformer in power conversion device 1 has been described above. However, embodiments are not limited thereto. For example, a configuration having similar characteristics to coil device 101Aa in FIG. 2 to FIG. 7 or coil device 101Ab in FIG. 8 may be applied to coil device 102, 103, 104 included in power conversion device 1.

Second Embodiment

Configuration of Coil Device 101

Figure 9:
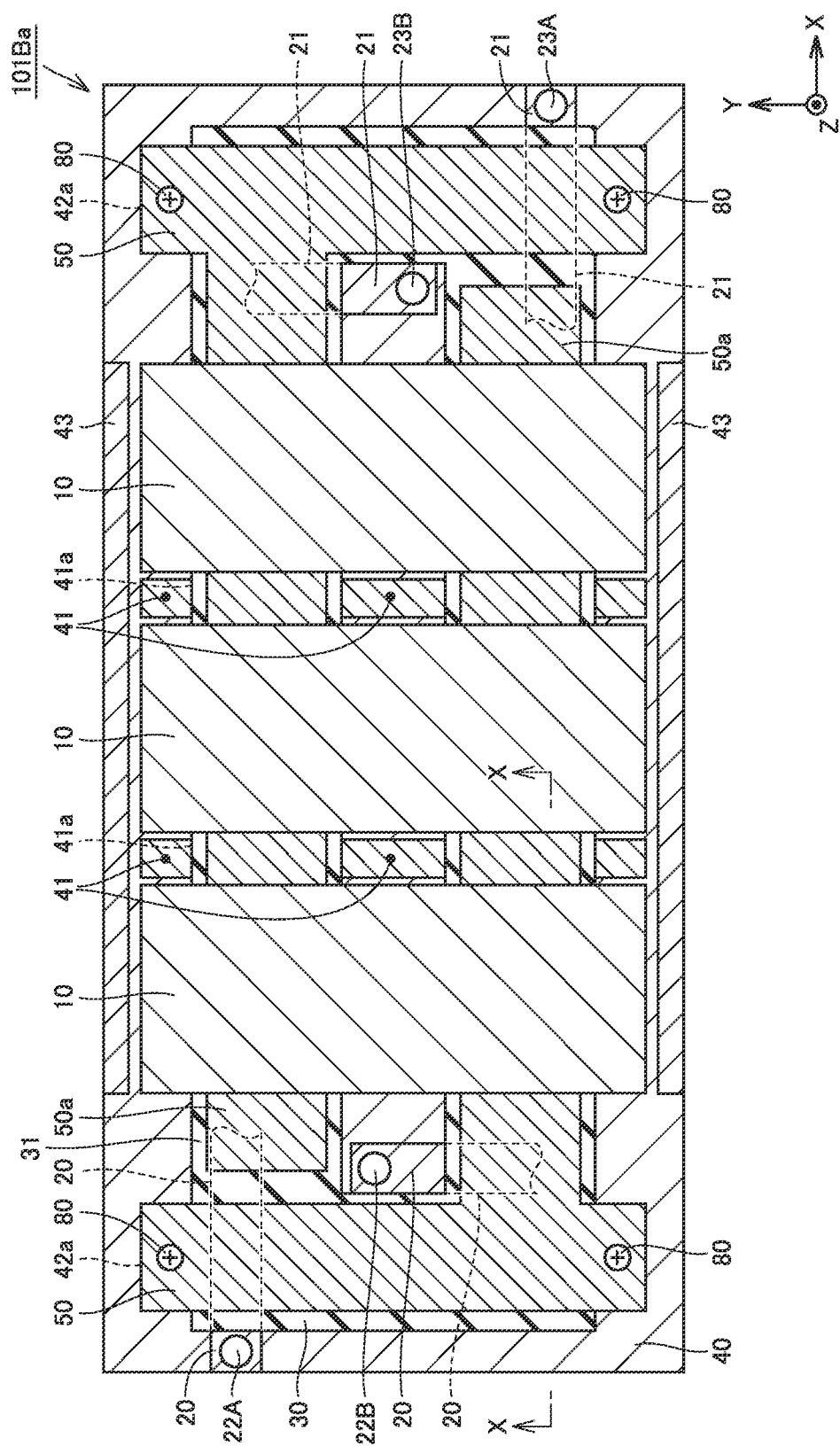
FIG. 9 is a schematic plan view showing a configuration of the coil device as a transformer according to a first example of a second embodiment.
Figure 10:
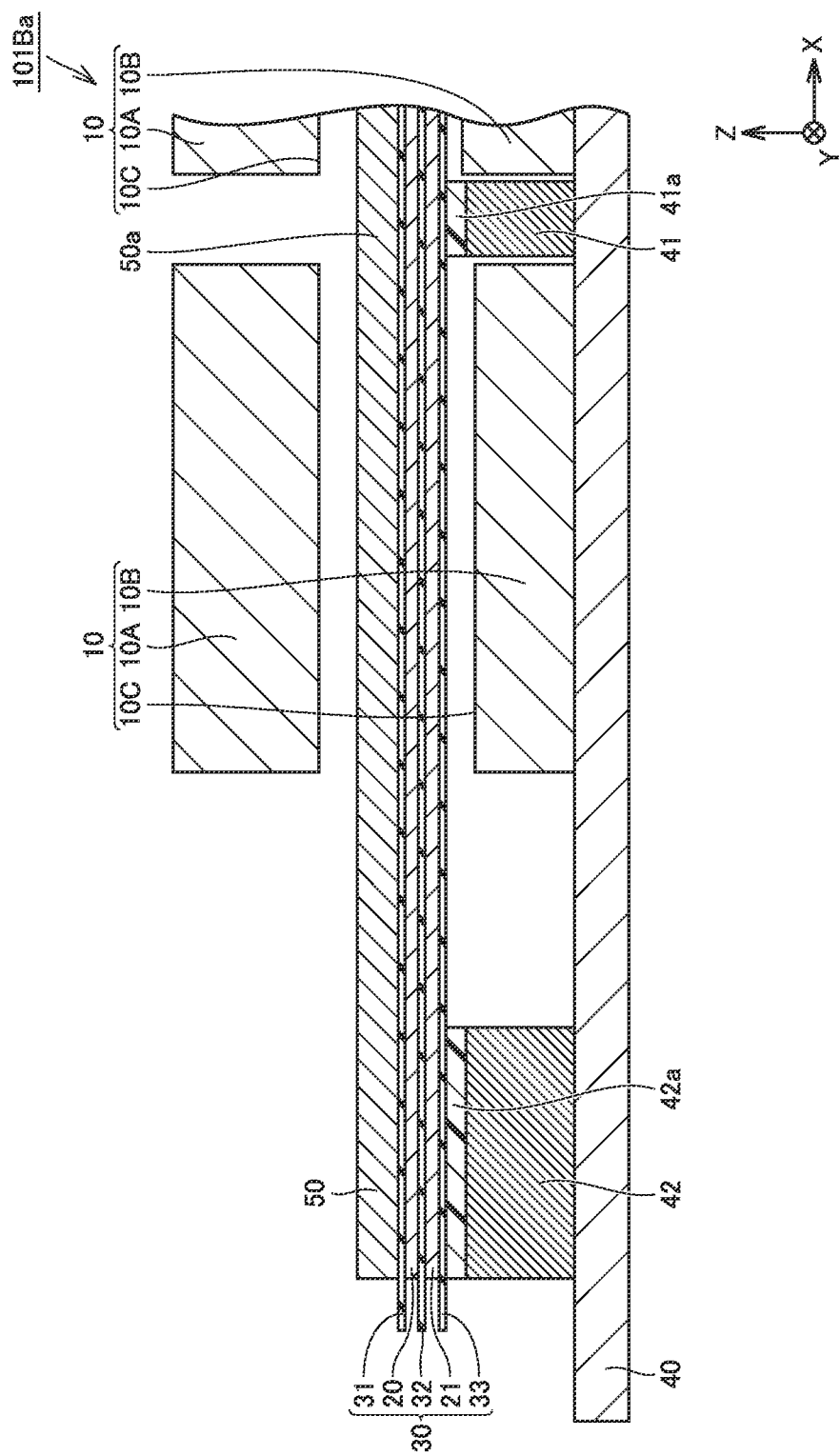
FIG. 10 is a schematic cross-sectional view of the coil device in FIG. 9 in a portion along line X-X in FIG. 9.

FIG. 9 is a schematic plan view showing a configuration of the coil device as a transformer according to a first example of a second embodiment. FIG. 10 is a schematic cross-sectional view of the coil device in FIG. 9 in a portion along line X-X in FIG. 9. Referring to FIG. 9 and FIG. 10, a coil device 101Ba in the first example of the present embodiment basically has a configuration similar to coil device 101Aa, and the same components are denoted by the same reference signs and will not be further elaborated. However, coil device 101Ba differs from coil device 101Aa in planar shape of the fixing member.

Specifically, in coil device 101Ba, second fixing member 50 shaped like a flat plate is fixed to second protruding member 42 or support 40 on its lower side by screws 80 with laminated coil 30 and second heat transfer member 42a interposed, similarly to second fixing member 52 in coil device 101Aa. Second fixing member 50 not only extends above second protruding member 42 but also extends therefrom in the X direction. This second fixing member 50 branches in the X direction from above second protruding member 42 and extends in the X direction so as to be arranged at a position substantially overlapping with the arrangement position of the coils and the insulating members at laminated coil 30. In this way, the portion of the fixing member branching from above second protruding member 42 and extending in the X direction is arranged as a second fixing member extending portion 50a.

Second fixing member extending portion 50a extends in the X direction and therefore passes through the same position as the position where firm fixing member 51 is arranged in coil device 101Aa, that is, a part of a region above first protruding member 41. Here, specifically, second fixing member extending portion 50a is arranged at a position substantially overlapping with laminated coil 30 and the region above first protruding member 41. The outer edge of second fixing member extending portion 50a is present inside of the outer edge of laminated coil 30. However, embodiments are not limited thereto and both edges may be coincident. Second fixing member extending portion 50a in this region functions similarly to first fixing member 51 in coil device 101Aa and presses laminated coil 30, first heat transfer member 41a, and first protruding member 41 downward.

In FIG. 9, second fixing member 50 above second heat transfer member 42a on the left side has second fixing member extending portion 50a extending in the X direction so as to substantially overlap with a region of laminated coil 30 on the lower side in the drawing. Second fixing member 50 above second heat transfer member 42a on the right side has second, fixing member extending portion 50a extending so as to substantially overlap with a region of laminated coil 30 on the upper side in the drawing. However, conversely, second fixing member 50 on the left side may extend to overlap with laminated coil 30 on the upper side in the drawing.

When second fixing member 50 including second fixing member extending portion 50a is formed of a resin material, second fixing member extending portion 50a as the first fixing member may be fixed to, for example, first protruding member 41 that is a member below by screws 80 at the region above first protruding member 41. This configuration can improve vibration resistance of coil device 101Ba. At a region other than the region above first protruding member 41 second fixing member extending portion 50a presses laminated coil 30 downward.

As described above, in coil device 101Ba, a part of second fixing member extending portion 50a as the first fixing member is integrated with second fixing member 50.

Operation Effect

The present embodiment basically achieves an operation effect similar to that of the first embodiment and a description of the similar operation effect will not be repeated. The operation effect unique to coil device 101Ba in the first example of the present embodiment will now be described.

In coil device 101Ba, second fixing member extending portion 50a corresponding to the first fixing member is integrated with second fixing member 50. Even in this case, in the same manner as in coil device 101Aa in which they are separate, the first fixing member and the second member sandwich and fix laminated coil 30 in contact with laminated coil 30, together with first protruding member 41 and second protruding member 42 on the lower side. This configuration improves vibration resistance of each member and enhances the effect of preventing breakage by vibration, in the same manner as coil device 101Aa and the like.

When laminated coil 30 and second fixing member extending portion 50a are integrated by intimate contact, adhesion, or the like, their rigidity is improved and vibration resistance is thereby improved.

Modifications and Effect

Figure 11:
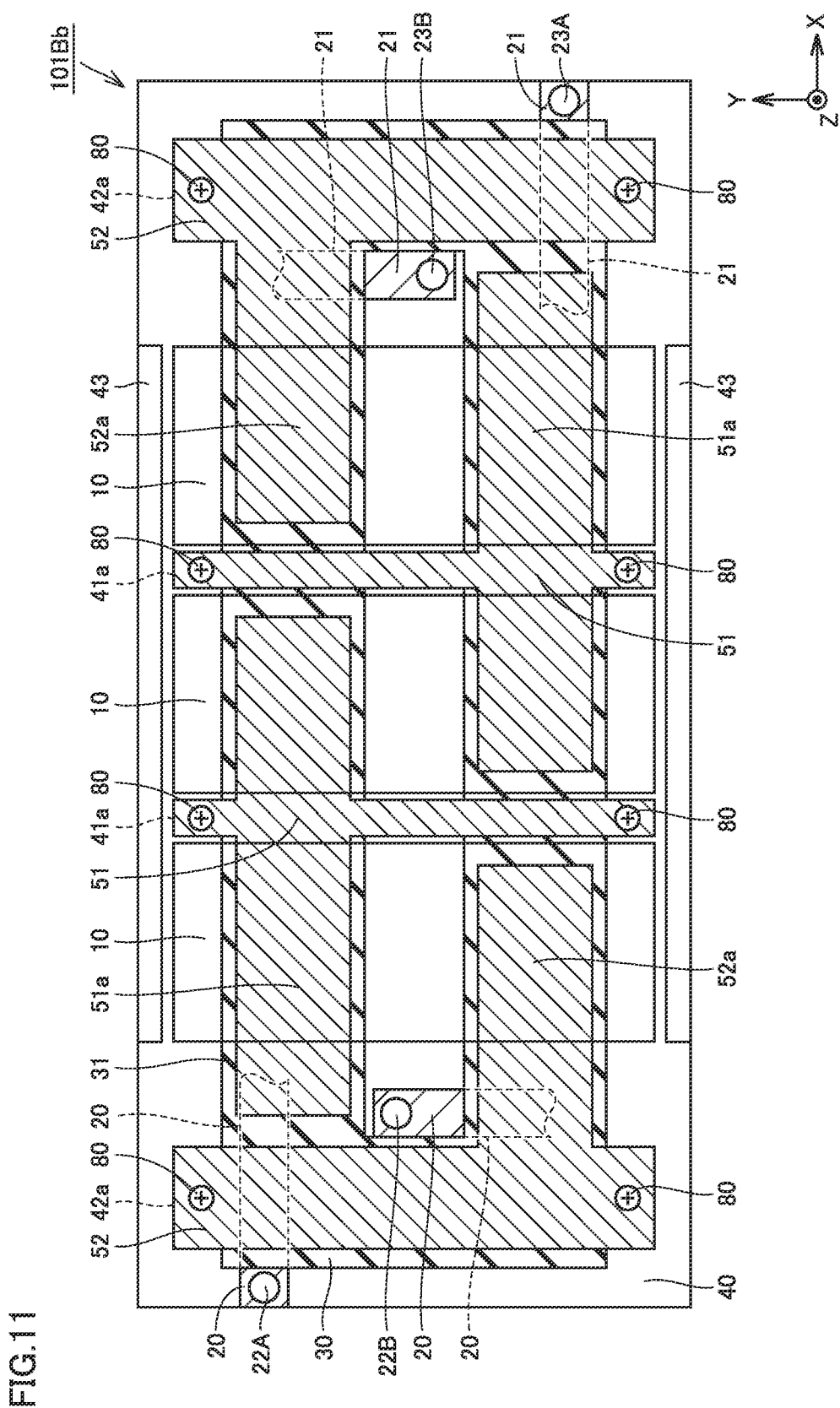
FIG. 11 is a schematic plan view showing a configuration of the coil device as a transformer according to a second example of the second embodiment.

FIG. 11 is a schematic plan view showing a configuration of the coil device as a transformer according to a second example of the second embodiment. Referring to FIG. 11, a coil device 101Bb in the second example of the present embodiment basically has a configuration similar to coil device 101Aa, and the same components are denoted by the same reference signs and will not be further elaborated. However, coil device 101Bb differs from coil device 101Aa in planar shape of the fixing member. For visibility of the drawings, core 10 is illustrated only with its outline.

Specifically, in coil device 101Bb, first fixing member 51 is arranged above first protruding member 41 in the same manner as in coil device 101Aa, and second fixing member 52 is arranged above second protruding member 42 in the same manner as in coil device 101Aa. However, in coil device 101Bb, first fixing member 51 not only extends above first protruding member 41 but also extends therefrom in the X direction. Second fixing member 52 not only extends above second protruding member 42 but also extends therefrom in the X direction.

First fixing member 51 branches in the X direction from above first protruding member 41 and extends in the X direction so as to be arranged at a position substantially overlapping with the arrangement position of the coils and the insulating members in laminated coil 30. This portion of the first fixing member branching from above first protruding member 41 and extending in the X direction is arranged as a first fixing member extending portion 51a. Second fixing member 52 branches in the X direction from above second protruding member 42 and extends in the X direction so as to be arranged at a position substantially overlapping with the arrangement position of the coils and the insulating members in laminated coil 30. This portion of the second fixing member branching from above second protruding member 42 and extending in the X direction is arranged as a second fixing member extending portion 52a.

First fixing member extending portion 51a and second fixing member extending portion 52a are isolated so as not to intersect another first fixing member 51 or another second fixing member 52. Therefore, the left one of two first fixing members 51 in FIG. 11 has first fixing member extending portion 51a at an upper left region of laminated coil 30. The right one of two first fixing members 51 in FIG. 11 has first fixing member extending portion 51a at a lower right region of laminated coil 30. The left one of two second fixing members 52 in FIG. 11 has second fixing member extending portion 52a at a lower left region, of laminated coil 30. The right one of two second fixing members 52 in FIG. 11 has second fixing member extending portion 52a at an upper right region of laminated coil 30. First fixing member extending portion 51a and second fixing member extending portion 52a press laminated coil 30 downward.

In this way, two first fixing members 51 and two second fixing members 52 are divided such that they are not in contact with each other. In this configuration, first fixing member 51 on the left side in FIG. 11 is sandwiched between first fixing member extending portion 51a and second fixing member extending portion 52a with a spacing, on the lower side in FIG. 11. First fixing member 51 on the rigid side in FIG. 11 is sandwiched between first fixing member extending portion 51a and second fixing member extending portion 52a with a spacing, on the upper side in FIG. 11. Second fixing member 52 on the left side in FIG. 11 is adjacent to first fixing member extending portion 51a with a spacing, on the upper side in the drawing. Second fixing member 52 on the right side in FIG. 11 is adjacent to first fixing member extending portion 51a with a spacing, on the lower side in the drawing. In a planar view of FIG. 11, two first fixing members 51 and two second fixing members 52 are arranged in point-symmetry with respect to a point at the center. Such a configuration may be employed as an example.

The operation effect unique to coil device 101Bb is as follows. First fixing member 51 has first fixing member extending portion 51a, second fixing member 52 has second fixing member extending portion 52a, and they are divided such that they are not in contact with each other and spaced apart from each other. In this configuration, the respective length in the extending direction of first fixing member extending portion 51a and second fixing member extending portion 52a can be reduced. Therefore, when each fixing member extending portion presses laminated coil 30 downward, the amount of deformation due to reactive force received from laminated coil 30, first heat transfer member 41a, and the like can be reduced. For this reason, laminated coil 30 can be fixed more reliably so as to be sandwiched between the fixing member and the protruding member.

Furthermore, since first fixing member extending portion 51a is shortened, the distance from the distal end of first fixing member extending portion 51a to screw 80 fixing it or to first protruding member 41 is reduced. Since second fixing member extending portion 52a is shortened, the distance from the distal end of second fixing member extending portion 52a to screw 80 fixing it or to second protruding member 42 is reduced. Consequently, thermal resistance from the distal end of first fixing member extending portion 51a to first protruding member 41 and support 40 is reduced, and the heat dissipation characteristics of first coil 20 and second coil 21 are improved. Second fixing member extending portion 52a achieves an effect similar to that of first fixing member extending portion 51a described above.

Figure 12:
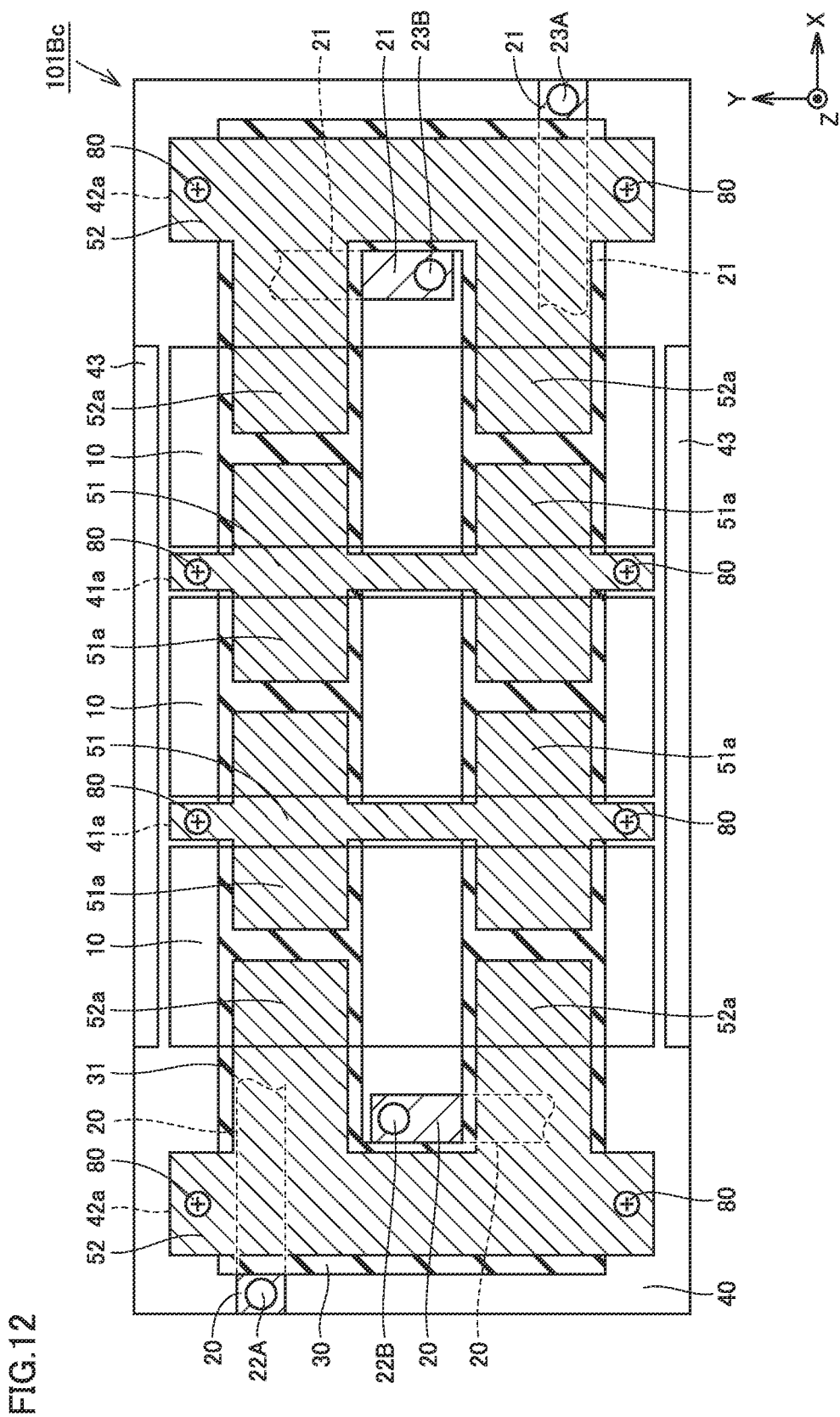
FIG. 12 is a schematic plan view showing a configuration of the coil device as a transformer according to a third example of the second embodiment.

FIG. 12 is a schematic plan view showing a configuration of the coil device as a transformer according to a third example of the second embodiment. Referring to FIG. 12, a coil device 101Bc in the third example of the present embodiment basically has a configuration similar to coil device 101Bb. The same components are denoted by the same reference signs and a description of overlapping portions will not be repeated. However, coil device 101Bc differs from coil device 101Bb in the extending manner of first fixing member extending portion 51a and second fixing member extending portion 52a.

Specifically, first fixing member extending portion 51a of each first fixing member 51 extends to overlap with both of an upper-side region and a lower-side region of laminated coil 30 in FIG. 12. Similarly, second fixing member extending portion 52a of each second fixing member 52 extends to overlap with both of an upper-side region and a lower-side region of laminated coil 30 in FIG. 12. First fixing member extending portions 51a and second fixing member extending portions 52a are adjusted in length such that they are line-symmetric with respect to the center in the right-left direction. In a planar view of FIG. 12, two first fixing members 51 and two second fixing members 52 are arranged in line-symmetry with respect to a straight line extending vertically at the center in the right-left direction. First fixing member extending portion 51a extending on the left side and first fixing member extending portion 51a extending on the right side in first fixing member 51 have equal extending lengths. This is applicable to second fixing member extending portion 52a. Such a configuration may be employed as an example and achieves art operation effect similar to that of FIG. 11.

Third Embodiment

Configuration of Coil Device 101

Figure 13:
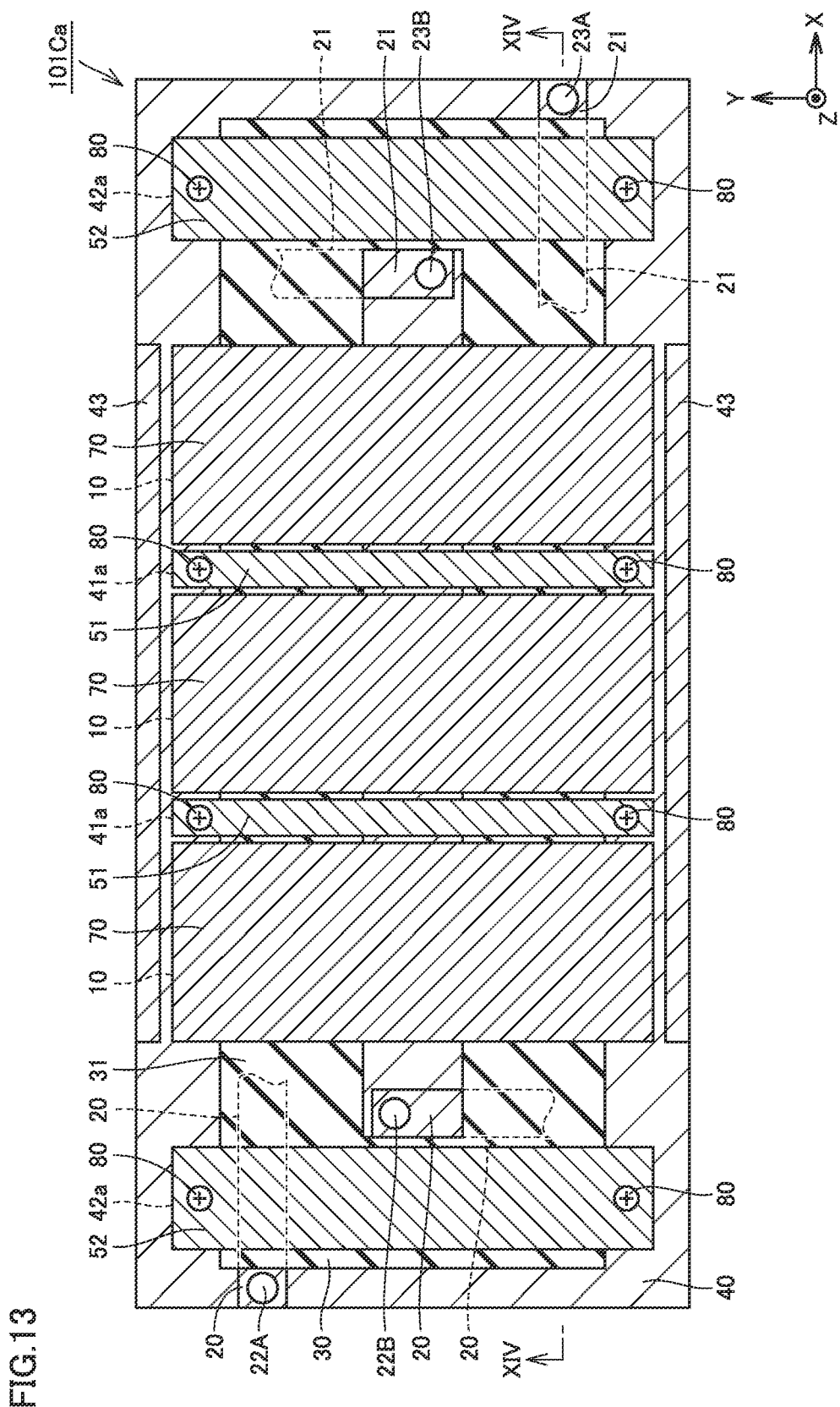
FIG. 13 is a schematic plan view showing a configuration of the coil device as a transformer according to a first example of a third embodiment.
Figure 14:
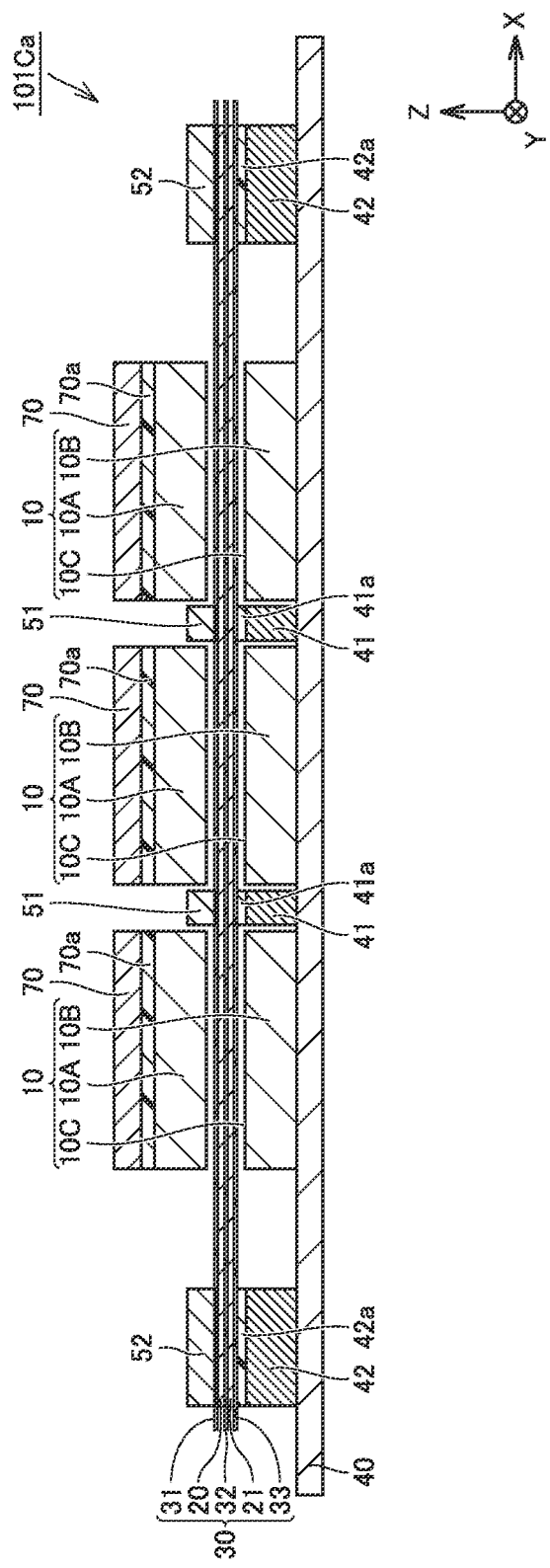
FIG. 14 is a schematic cross-sectional view of the coil device in FIG. 13 in a portion along line XIV-XIV in FIG. 13.

FIG. 13 is a schematic plan view showing a configuration of the coil device as a transformer according to a first example of a third embodiment. FIG. 14 is a schematic cross-sectional view of the coil device in FIG. 13 in a portion along line XIV-XIV in FIG. 13. Referring to FIG. 13 and FIG. 14, a coil device 101Ca in the first example of the present embodiment basically has a configuration similar to coil device 101Aa, and the same components are denoted by the same reference signs and will not be further elaborated. However, coil device 101Ca further includes a core fixing member 70 arranged above core 10. That is, coil device 101Ca further includes core fixing member 70, for example, arranged immediately above core 10. In this respect, coil device 101Ca differs from coil device 101Aa.

Core fixing member 70 of coil device 101Ca is in contact with, specifically, the uppermost surface of upper core 10A of core 10 with a third heat transfer member 70a interposed. In coil device 101Ca, third heat transfer member 70a is arranged in contact with the entire uppermost surface of upper core 10A. Furthermore, core fixing member 70 is arranged in contact with the entire surface of third heat transfer member 70a, that is, so as to overlap with the entire upper core 10A in a two-dimensional view.

Although not illustrated in the drawing, actually, core fixing member 70 is fixed to support 40 or first protruding member 41, for example, by screws. Core fixing member 70 thus presses upper core 10A and lower core 10B downward.

It is preferable that core fixing member 70 is formed of the same material and in the same process as support 40 and first fixing member 51 and second fixing member 52. However, core fixing member 70 may be formed of a different material and/or in a different process from support 40 and first fixing member 51 and second fixing member 52. Third heat transfer member 70a is preferably formed of the same material as first heat transfer member 41a and second heat transfer member 42a but ma be formed of a different material.

Operation Effect

The operation effect unique to coil device 101Ca is as follows. Core fixing member 70 presses upper core 10A and lower core 10B downward. Core fixing member 70 therefore enables upper core 10A and lower core 10B of core 10 to be placed so as to be reliably fixed on a surface of support 40.

Upper core 10A is then pushed from above through core fixing member 70, rather than being directly pushed downward from above. Therefore, the force received by upper core 10A from above is applied by core fixing member 70 over the entire surface of upper core 10A. Thus, the load exerted on upper core 10A from above can be distributed such that it is received over a region of upper core 10A overlapping with core fixing member 70 that is, for example, the entire upper surface of upper core 10A. That is, breakage of upper core 10A due to downward load concentrated on only a partial region of the surface of upper core 10A can be prevented.

Core fixing member 70 is in contact with core 10 with third heat transfer member 70a interposed. In this configuration, heat generated from core 10 is mainly transferred to core fixing member 70, thereby suppressing temperature increase of core 10. Although not illustrated in the drawing, core fixing member 70 is fixed to support 40 or first protruding member 41 as described above. Heat transferred front upper core 10A to core fixing member 70 therefore can be not only dissipated upward therefrom and but also dissipated front support 40 to the lower side of coil device 101CA. In this way, since heat can be dissipated from both above and below, heat dissipation characteristics of coil device 101Ca are further enhanced. In other words, temperature increase of upper core 10A can be reduced.

Modifications and Effect

Figure 15:
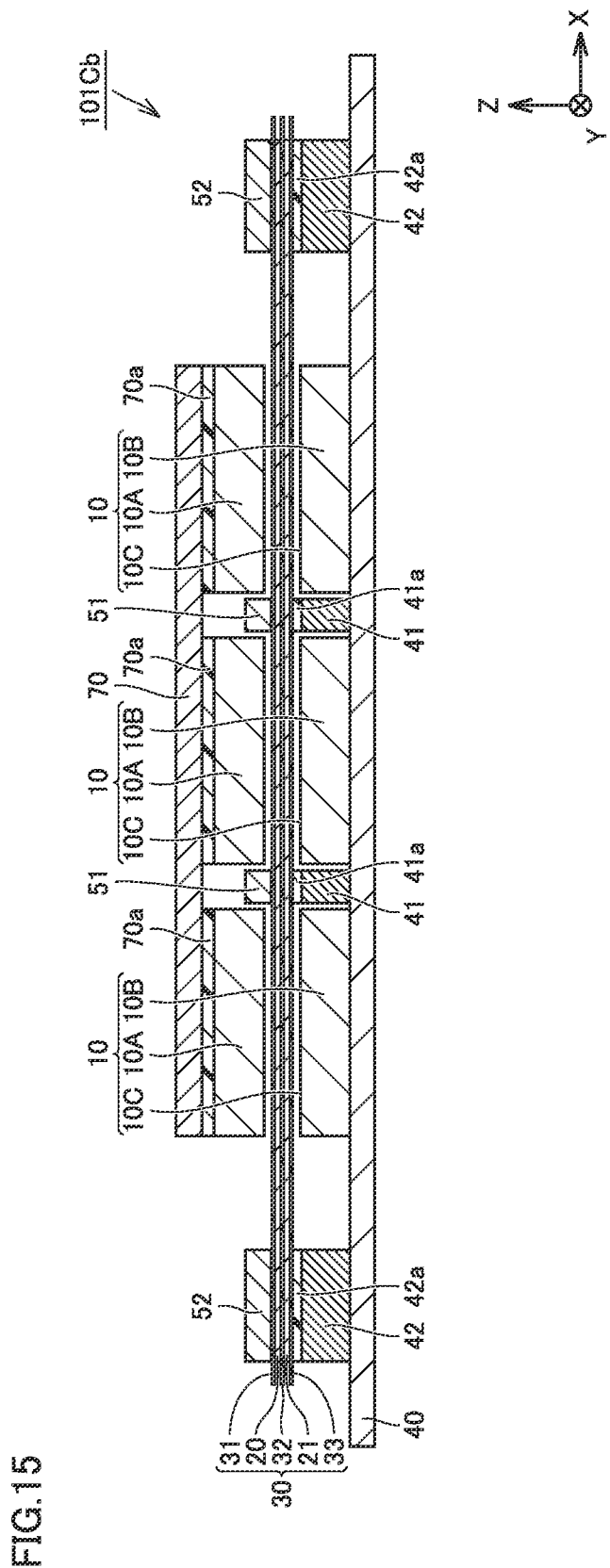
FIG. 15 is a schematic cross-sectional view showing a configuration of the coil device a transformer according to a second example of the third embodiment.

FIG. 15 is a schematic cross-sectional view showing is configuration of the coil device as a transformer according to a second example of the third embodiment. That is, this corresponds to FIG. 14 for the coil device in the second example of the third embodiment. In the subsequent drawings, only the cross sections of the coil device similar to those in FIG. 14 and FIG. 15 at the same position as in FIG. 14 and FIG. 15 are shown.

Referring to FIG. 15, a coil device 101Cb in the second example of the present embodiment basically has a configuration similar to coil device 101Ca. The same components are denoted by the same reference signs and a description of overlapping portions will not be repeated. However, in coil device 101Cb, core fixing member 70 above the respective upper cores 10A of a plurality of, for example, three cores 10 aligned is continuous and integrated. In this respect, core fixing member 70 differs from coil device 101Ca in which core fixing members 70 are arranged separately for individual cores 10.

In this way, single core fixing member 70 presses a plurality of upper cores 10A downward simultaneously. Thus, in the inside of core fixing member 70, heat transferred from cores 10 is homogenized. Therefore, core fixing member 70 that is the destination of heat dissipated upward from cores 10 can homogenize individual temperature increases of a plurality of cores 10. Furthermore, since heat generated from cores 10 is mainly transferred to core fixing member 70, temperature increase of cores 10 can be suppressed.

Fourth Embodiment

Configuration of Coil Device 101

Figure 16:
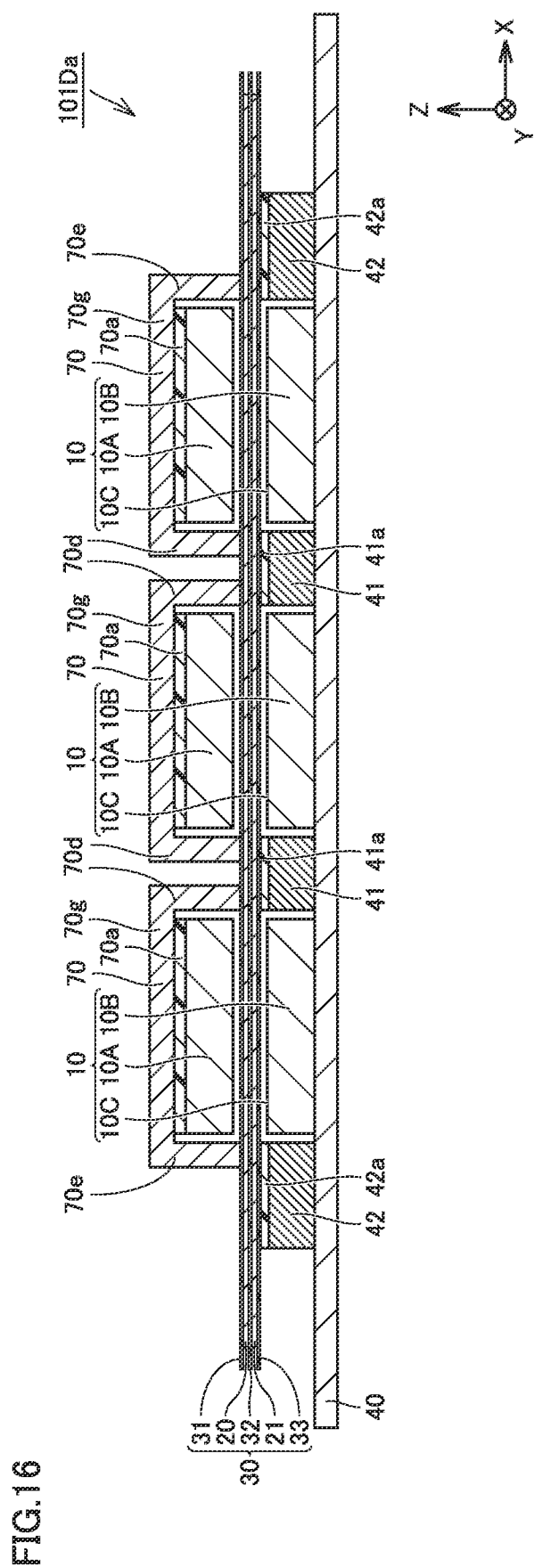
FIG. 16 is a schematic cross-sectional view showing a configuration of the coil device as a transformer according to a first example of a fourth embodiment.

FIG. 16 is a schematic cross-sectional view showing a configuration of the coil device as a transformer according to a first example of a fourth embodiment. Referring to FIG. 16, a coil device 101Da in the first example of the present embodiment basically has a configuration similar to coil device 101Ca, and the same components are denoted by the same reference signs and will not be further elaborated. However, in coil device 101Da, core fixing member 70 arranged above core 10 further has a planar portion 70g and peripheral portions 70d and 70e. In this respect, coil device 101Da differs from coil device 101Ca in which core fixing member 70 is simply arranged above core 10.

Planar portion 70g of core fixing member 70 is a region corresponding to core fixing member 70 in coil device 101Ca in a similar manner. More specifically, planar portion 70g is a region serving as a portion above core 10, that is, a region of core fixing member 70 that is arranged above core 10, two-dimensionally overlaps with the uppermost surface of upper core 10A, and is in contact with third heat transfer member 70a. Planar portion 70g extends along the XY plane. Planar portion 70g presses upper core 10A toward support 40, that is, to the lower side in the Z direction with third heat transfer member 70a interposed.

Peripheral portion 70d of core fixing member 70 is a region outside the region overlapping with upper core 10A in a two-dimensional view, specifically, a region serving as a portion above first protruding member 41 that is placed above first protruding member 41. Peripheral portion 70d is bent at an end portion in the X direction of planar portion 70g and extends therefrom toward support 40 along the Z direction. Thus, peripheral portion 70d is continuous to planar portion 70g. The distal end of peripheral portion 70d is in contact with, for example, the uppermost surface of insulating member 31 (see FIG. 7) that is the uppermost surface of laminated coil 30. In other words, peripheral portion 70d corresponds to, for example, first fixing member 51 in the first embodiment.

Peripheral portion 70e of core fixing member 70 is a region outside the region overlapping with upper core 10A in a two-dimensional view, specifically, a region serving as a portion above second protruding member 42 that is placed above second protruding member 42. Peripheral portion 70d is bent at an end portion in the X direction of planar portion 70g and extends therefrom toward support 40 along the Z direction. Thus, peripheral portion 70e is continuous to planar portion 70g. The distal end of peripheral portion 70e is in contact with, for example, the uppermost surface of insulating member 31 (see FIG. 7) that is the uppermost surface of laminated coil 30. In other words, peripheral portion 70c corresponds to, for example, second fixing member 52 in the first embodiment.

That is, coil device 101Da does not include first fixing member 51 or second fixing member 52 in coil device 101Aa or the like. Instead, in coil device 101Da, peripheral portion 70d that is a part of core fixing member 70 corresponds to first fixing member 51, and peripheral portion 70e that is a part of core fixing member 70 corresponds to second fixing member 52. Peripheral portion 70d therefore functions similarly to first fixing member 51 in coil device 101Aa or the like, and peripheral portion 70e functions similarly to second fixing member 52 in coil device 101Aa or the like. Planar portion 70g functions similarly to core fixing member 70 in coil device 101Ca or the like. That is, peripheral portion 70d can serve as the first fixing member and press laminated coil 30 toward support 40 on the lower side in the Z direction. Peripheral portion 70e can serve as the second fixing member and press laminated coil 30 toward support 40 on the lower side in the Z direction. It is therefore preferable that core fixing member 70 is formed of the same material and in the same process as support 40 and first fixing member 51 and second fixing member 52.

Peripheral portion 70d and peripheral portion 70e both are parts of the same core fixing member 70. Thus, even in coil device 101Da, the first fixing member and the second fixing member are integrated, similarly to, for example, coil device 101Ba.

As described above, in coil device 101Da, core fixing member 70 extends from planar portion 70g as a portion above core 10 to peripheral portion 70d as a portion above first protruding member 41 and to peripheral portion 70e as a portion above second protruding member 42. A partial region of core fixing member 70, that is, peripheral portion 70d above first protruding member 41 is arranged as the first fixing member and functions similarly to the first fixing member. Another partial region of core fixing member 70, that is, peripheral portion 70e above second protruding member 42 is arranged as the second fixing member and functions similarly to the second fixing member.

In FIG. 16, peripheral portion 70d overlaps with only a partial region in a two-dimensional view of first protruding member 41, and sandwiches and fixes laminated coil 30 together with first protruding member 41 only at the partial region. Similarly, in FIG. 16, peripheral portion 70e overlaps with only a partial region in a two-dimensional view of second protruding member 42 and sandwiches and fixes laminated coil 30 together with second protruding member 42 only at the partial region. It is preferable that peripheral portions 70d and 70e are in contact with and sandwich laminated coil 30 over an area as large as possible. However, as shown in FIG. 16, peripheral portions 70d and 70e may overlap with first protruding member 41 and second protruding member 42 only at partial regions and sandwich laminated coil 30 together with them.

Operation Effect

Coil device 101Da achieves an operation effect similar to that of coil devices 101Ca and 101Cb and further achieves the following operation effect. The operation effect unique to coil device 101Da in the first example of the present embodiment will now be described. In coil device 101Da, core fixing member 70 extends from planar portion 70g as a portion above core 10 to at least one of, for example, peripheral portion 70d as a portion above first protruding member 41 and, for example, peripheral portion 70e as a portion above second protruding member 42. In this configuration, a partial region of core fixing member 70 is arranged as at least one of the first fixing member and the second fixing member.

Because of such a configuration, a part of core fixing member 70 can be used as the first fixing member and the second fixing member. This eliminates the need for providing the first fixing member and the second fixing member as independent members, and core fixing member 70 can be effectively used. Even with this configuration, the effect of sandwiching fixing and pressing can be achieved by peripheral portions 70d and 70e as the first fixing member and the second fixing member that are parts of core fixing member 70, in the same manner as the foregoing other embodiments. Since peripheral portions 70d and 70e are in contact with laminated coil 30, the effect of heat dissipation from laminated coil 30 can be achieved in the same manner as in the foregoing other embodiments. Even in the present embodiment, the heal dissipation effect by the heat transfer member can be achieved.

Modifications and Effect

Figure 17:
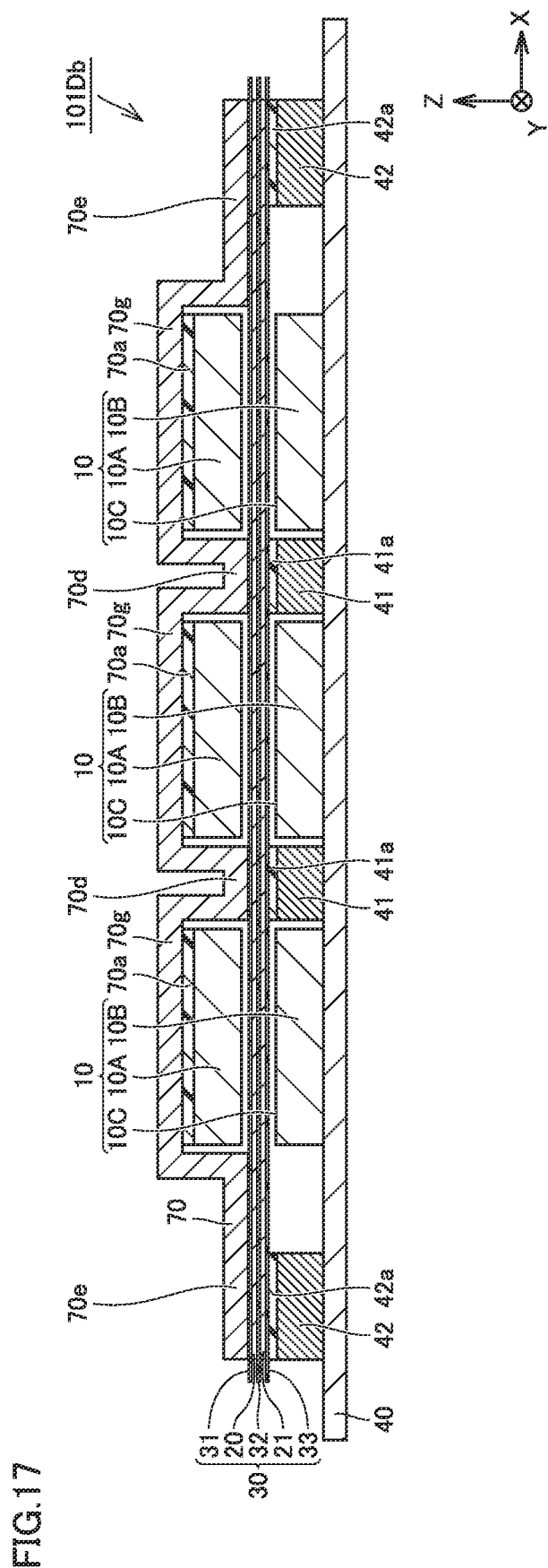
FIG. 17 is a schematic cross-sectional view showing a configuration of the coil device as a transformer according to a second example of the fourth embodiment.
Figure 18:
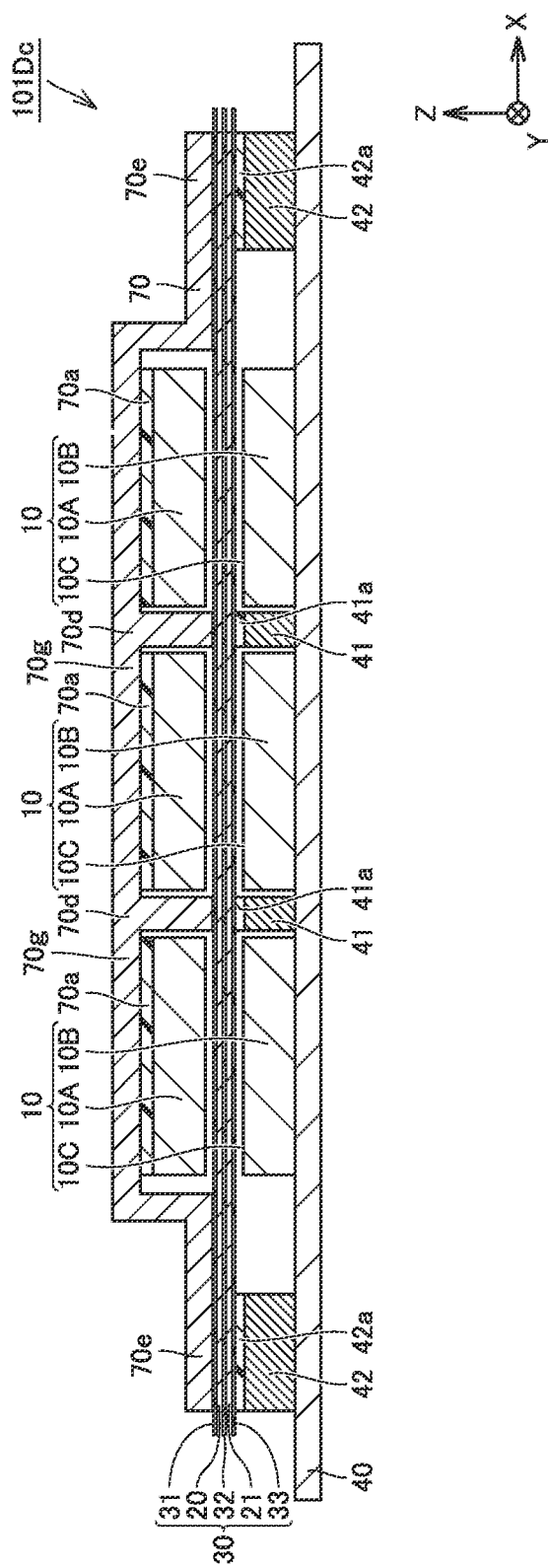
FIG. 18 is a schematic cross-sectional view showing a configuration of the coil device as a transformer according to a third example of the fourth embodiment.

FIG. 17 is a schematic cross-sectional view showing a configuration of the coil device as a transformer according to a second example of the fourth embodiment. FIG. 18 is a schematic cross-sectional view showing a configuration of the coil device as a transformer according to a third example of the fourth embodiment. Referring to FIG. 17, a coil device 101Db in the second example of the present embodiment basically has a configuration similar to coil device 101Da. The same components are denoted by the same reference signs and a description of overlapping port ions will not be repeated. However, in coil device 101Db, core fixing member 70 above respective upper cores 10A of a plurality of, for example, three cores 10 aligned is continuous and integrated, in the same manner as in FIG. 15. More specifically, peripheral portion 70d and peripheral portion 70e each have a portion extending along the XY plane in contact with laminated coil 30, in addition to a portion extending in the Z direction. Peripheral portion 70e refers to the entire portion in FIG. 17 of core fixing member 70 that is arranged on the outside in the X direction of the entire set of cores 10. That is, peripheral portion 70e is not limited to the portion immediately above second protruding member 42. Peripheral portion 70e includes a portion that does not overlap with second protruding member 42 and extends in the Z direction. In this respect, core fixing member 70 here differs from coil device 101Da in which core fixing members 70 are arranged separately for individual cores 10 and peripheral portions 70d and 70e each include only a portion extending in the Z direction. Coil device 101Db achieves a similar effect as in coil device 101Da and coil device 101Cb.

Referring to FIG. 18, this coil device 101De is basically a configuration similar to coil device 101Db, but the width in the X direction of first protruding member 41 is narrower than that of coil device 101Db. In this configuration, peripheral portion 70d does not have a portion extending along the XY plane and only has a portion extending in the Z direction. Peripheral portion 70d only having a portion extending in the Z direction is arranged so as to overlap with almost the entire region two dimensionally overlapping with first protruding member 41 with respect to at least the X direction.

The shape of peripheral portion 70d may be as illustrated in FIG. 17 or may be as illustrated in FIG. 18. Although not illustrated in the drawing, peripheral portion 70e may be modified as appropriate, for example, according to the shape of second protruding member 42.

Figure 19:
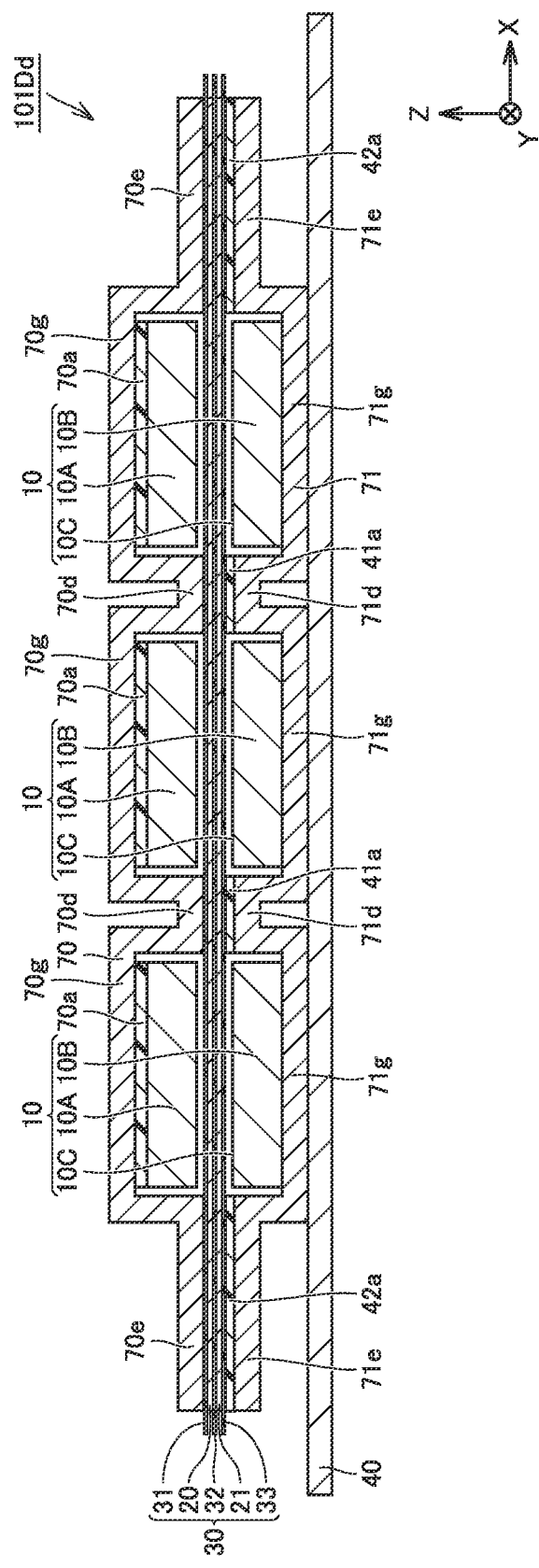
FIG. 19 is a schematic cross-sectional view showing a configuration of the coil device as a transformer according to a fourth example of the fourth embodiment.

FIG. 19 is a schematic cross-sectional view showing a configuration of the coil device as a transformer according to a fourth example of the fourth embodiment. Referring to FIG. 19, a coil device 101Dd in the fourth example of the present embodiment basically has a configuration similar to coil device 101Db. The same components are denoted by the same reference signs and a description of overlapping portions will not be repeated. However, coil device 101Dd differs from coil device 101Db in that it includes a core fixing member 71, in addition to core fixing member 70.

Core fixing member 71 is formed of the same material as core fixing member 70. Core fixing member 71 includes a region arranged immediately below core 10. Core fixing member 71 is arranged substantially in line-symmetry to core fixing member 70 with respect to laminated coil 30. More specifically, core fixing member 71 has a planar portion 71g and peripheral portions 71d and 71e, and they are continuous and integrated, similarly to core fixing member 70. Planar portion 71g is a region overlapping with planar portion 70g, peripheral portion 71d is a region overlapping with peripheral portion 70d, and peripheral portion 71e is a region overlapping with peripheral portion 70e, in a two-dimensional view. Planar portion 71g, peripheral portion 71d, and peripheral portion 71e therefore have substantially the same shape as planar portion 70g, peripheral portion 70d, and peripheral portion 70e, respectively, so as to overlap with them in a two-dimensional view. Planar portion 71g is arranged so as to overlap with the lower surface of lower core 10B.

Peripheral portion 71d that is outside of a region overlapping with core 10 and overlaps with peripheral portion 70d has a portion extending in the Z direction and a portion extending along the XY plane, similarly to peripheral portion 70d. The portion extending in the Z direction of the peripheral portion is in contact with the upper surface of support 40, for example, so as to be fixed thereto. Peripheral portion 71d therefore corresponds to first protruding member 41 in coil device 101Aa or the like. Similarly, peripheral portion 71e that is outside of a region overlapping with core 10 and overlaps with peripheral portion 70e has a portion extending in the Z direction and a portion extending along the XY plane, similarly to peripheral portion 70e. The portion extending in the Z direction of the peripheral portion is in contact with the upper surface of support 40, for example, so as to be fixed thereto. Peripheral portion 71e therefore corresponds to second protruding member 42 in coil device 101Aa or the like. Peripheral portion 71d therefore functions similarly to first protruding member 41 in coil device 101Aa or the like, and peripheral portion 71e functions similarly to second protruding member 42 in coil device 101Aa or the like.

The portion extending along the XY plane of the peripheral portion 71d is in contact with laminated coil 30 with first heal transfer member 41a interposed. First heat transfer member 41a also may be considered as the first protruding member, that is, a part of peripheral portion 71d.

The portion extending along the XY plane of peripheral portion 71e is in contact with laminated coil 30 with second heat transfer member 42a interposed. Second heat transfer member 42a also may be considered as the second protruding member, that is, a part of peripheral portion 71e.

Coil device 101Dd can achieve an operation effect similar to coil device 101Db. More specifically, core fixing member 71 extends from planar portion 71g immediately below core 10 to peripheral portion 71d immediately below peripheral portion 70d and peripheral portion 71e immediately below peripheral portion 70e. Peripheral portion 71d is arranged as the first protruding member extending in the Z direction in contact with the upper surface of support 40, and peripheral portion 71e is arranged as the second protruding member extending in the Z direction in contact with the upper surface of support 40. Thus, the first protruding member and the second protruding member are incorporated into core fixing member 71.

Because of such a configuration, a part of core fixing member 71 can be used as the first protruding member and the second protruding member. This eliminates the need for providing the first protruding member and the second protruding member as independent members, and core fixing member 71 can be effectively used. Even with this configuration, the effect of sandwiching fixing and pressing can be achieved by peripheral portions 71d and 71e as the first protruding member and the second protruding member that are parts of core fixing member 71, in the same manner as the foregoing other they embodiments. Since peripheral portions 71d and 71e are in contact with laminated coil 30, the effect of heat dissipation from laminated coil 30 can be achieved in the same manner as in the foregoing other embodiments. Even in the present embodiment, the heat dissipation effect by the heat transfer member can be achieved.

The features described in the foregoing embodiments (and the examples included therein) may be combined and applied as appropriate in a technically consistent manner.

Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 power conversion device, 2 inverter circuit 3 transformer circuit, 4 rectifying circuit, 5 smoothing circuit, 6 control circuit, 7a, 7b, 7c, 7d switching element, 9a, 9b capacitor, 10 core, 10A upper core, 10B lower core, 10C, 41C, 42C cavity, 10E wound portion, 20 first coil, 21 second coil, 22A, 22B, 23A, 23B connection member, 31, 32, 33 insulating member, 40 support, 41 first protruding member, 41a first heat transfer member, 42 second protruding member, 42a second heat transfer member, 43 support protruding portion, 50, 52 second fixing member, 50a, 52a second fixing member extending portion, 51 first fixing member, 51a first fixing member extending portion, 70, 71 core fixing member, 70a third heat transfer member, 70d, 70e peripheral portion, 70g planar portion, 80 screw, 101, 101Aa, 101Ab, 101Ba, 101Bb, 101Bc, 101Ca, 101Cb, 101Da, 101Db, 101Dc, 102, 103, 104 coil device, 110 input to 111 output terminal.

The invention claimed is:

1. A power conversion device comprising a coil device, the coil device comprising:
  a support;
  a laminated coil including a plurality of planar coils laminated;
  a plurality of cores spaced apart from each other and aligned in a longitudinal direction of the planar coils, the cores each including a portion around which the laminated coil is wound;
  a first protruding member arranged between a pair of cores adjacent to each other with respect to the longitudinal direction and fixed to the support; and
  a first fixing member,
  wherein the laminated coil is sandwiched and fixed between the first fixing member and the first protruding member.

2. The power conversion device according to claim 1, wherein
  three or more cores are aligned in the longitudinal direction, and
  the coil device comprises a plurality of the first protruding members each arranged between the pair of cores.

3. The power conversion device according to claim 1, wherein
  the coil device further comprises:
  a second protruding member arranged on outside of the cores with respect to the longitudinal direction; and
  a second fixing member arranged above the second protruding member,
  wherein the laminated coil is sandwiched and fixed between the second fixing member and the second protruding member such that a first surface is in contact with the second protruding member and a second surface on an opposite side to the first surface is in contact with the second fixing member.

4. The power conversion device according to claim 3, wherein the second protruding member is fixed to the support.

5. The power conversion device according to claim 3, further including a heat transfer member arranged in contact with the laminated coil, disposed between at least one of the second protruding member and the second fixing member and the laminated coil.

6. The power conversion device according to claim 3, wherein the first fixing member and the second fixing member are integrated.

7. The power conversion device according to claim 3, wherein the first protruding member and the second protruding member are integrated.

8. The power conversion device according to claim 3, wherein the coil device further comprises a core fixing member arranged above the core.

9. The power conversion device according to claim 8, wherein the core fixing member is in contact with the core with a third heat transfer member interposed.

10. The power conversion device according to claim 8, wherein the core fixing member extends from a portion above the core to at least one of a portion above the first protruding member and a portion above the second protruding member, and a partial region of the core fixing member is arranged as at least one of the first fixing member and the second fixing member.

11. The power conversion device according to claim 1, wherein
  the laminated coil has a first coil and a second coil as the planar coils, and
  the laminated coil includes an insulating member between the first coil and the second coil.

12. The power conversion device according to claim 11, wherein
  the first coil and the second coil have different potentials, and
  the first coil, the second coil, and the cores constitute one transformer.

13. The power conversion device according to claim 11, wherein the laminated coil includes a plurality of either or both of the first coils and the second coils.

14. The power conversion device according to claim 1, further including a heat transfer member arranged in contact with the laminated coil, disposed between at least one of the first protruding member and the first fixing member and the laminated coil.

* * * * *